(12) United States Patent
Liu et al.

(10) Patent No.: US 11,259,362 B2
(45) Date of Patent: Feb. 22, 2022

(54) METHOD FOR REPEATEDLY TRANSMITTING DATA AND DEVICE

(71) Applicant: Huawei Technologies Co., Ltd., Shenzhen (CN)

(72) Inventors: Hang Liu, Beijing (CN); Zhenzhen Cao, Beijing (CN); Mingchao Li, Beijing (CN); Yinghui Yu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/778,438

(22) Filed: Jan. 31, 2020

(65) Prior Publication Data
US 2020/0170073 A1 May 28, 2020

Related U.S. Application Data

(63) Continuation of application No. PCT/CN2018/088845, filed on May 29, 2018.

(30) Foreign Application Priority Data

Aug. 2, 2017 (CN) .......................... 201710653478.8

(51) Int. Cl.
*H04W 80/08* (2009.01)
*H04W 76/27* (2018.01)
(Continued)

(52) U.S. Cl.
CPC ........... *H04W 80/08* (2013.01); *H04W 72/02* (2013.01); *H04W 72/1247* (2013.01);
(Continued)

(58) Field of Classification Search
CPC ............. H04W 72/1247; H04W 72/02; H04W 72/1273; H04W 80/02; H04W 80/08;
(Continued)

(56) References Cited

U.S. PATENT DOCUMENTS

2006/0233151 A1  10/2006 Suda
2017/0078945 A1  3/2017 Ma et al.
(Continued)

FOREIGN PATENT DOCUMENTS

CN  105025593 A  11/2015
CN  105101301 A  11/2015
(Continued)

OTHER PUBLICATIONS

Intel Corp., "Packet duplication for URLLC within a gNB," 3GPP TSG-RAN WG2 97 meeting, R2-1701720, Athens, Greece, Feb. 13-17, 2017, 3 pages.
(Continued)

*Primary Examiner* — Jianye Wu
(74) *Attorney, Agent, or Firm* — Slater Matsil, LLP

(57) ABSTRACT

This application provides a method for repeatedly transmitting data and a device. The method includes: separately sending, by a terminal device, one piece of data in a PDCP entity to N logical channels, where a direct link transmission manner is used on at least one of the N logical channels, and N is a positive integer greater than or equal to 2; obtaining, by the terminal device, a resource; and sending, by the terminal device, the data on the N logical channels by using the obtained resource.

15 Claims, 16 Drawing Sheets

(51) Int. Cl.
*H04W 72/02* (2009.01)
*H04W 72/12* (2009.01)
*H04W 80/02* (2009.01)

(52) U.S. Cl.
CPC ....... *H04W 72/1273* (2013.01); *H04W 76/27* (2018.02); *H04W 80/02* (2013.01)

(58) Field of Classification Search
CPC ..... H04W 76/15; H04W 76/27; H04W 76/14; H04L 45/24
See application file for complete search history.

(56) References Cited

U.S. PATENT DOCUMENTS

| | | | |
|---|---|---|---|
| 2017/0208618 | A1 | 7/2017 | Ding et al. |
| 2017/0265187 | A1* | 9/2017 | Chen ................. H04W 72/0446 |

FOREIGN PATENT DOCUMENTS

| | | |
|---|---|---|
| CN | 105530712 A | 4/2016 |
| CN | 106331978 A | 1/2017 |
| WO | 2015163639 A1 | 10/2015 |
| WO | 2017051330 A1 | 3/2017 |

OTHER PUBLICATIONS

CATT, "Impact of PDCP duplication on RLC," 3GPP TSG-RAN WG2 Meeting #NR AH2, R2-1706376, Qingdao, China, Jun. 27-29, 2017, 3 pages.

Interdigital Communications, "Packet Duplication at PDCP," 3GPP TSG-RAN WG2 Meeting #97, R2-1701186, Athens, Greece, Feb. 13-17, 2017, 2 pages.

3GPP TSG-RAN WG2 Meeting #97bis, R2-1702642, "Duplication Impacts to PDCP", Nokia, Alcatel-Lucent Shanghai Bell,Spokane, USA, Apr. 3-7, 2017, 5 pages.

3GPP TS 36.331 V14.3.0 (Jun. 2017), 3rd Generation Partnership Project; Technical Specification Group Radio Access Network; Evolved Universal Terrestrial Radio Access (E-UTRA); Radio Resource Control (RRC); Protocol specification (Release 14), 745 pages.

3GPP TS 36.321 V14.3.0 (Jun. 2017), 3rd Generation Partnership Project; Technical Specification Group Radio Access Network; Evolved Universal Terrestrial Radio Access (E-UTRA); Medium Access Control (MAC) protocol specification (Release 14), 107 pages.

3GPP TS 36.323 V14.3.0 (Jun. 2017), 3rd Generation Partnership Project; Technical Specification Group Radio Access Network; Evolved Universal Terrestrial Radio Access (E-UTRA); Packet Data Convergence Protocol (PDCP) specification (Release 14), Jun. 2017. total 43 pages.

3GPP TS 23.303 V15.0.0 (Jun. 2017), 3rd Generation Partnership Project; Technical Specification Group Services and System Aspects; Proximity-based services (ProSe); Stage 2 (Release 15), Jun. 2017, 130 pages.

3GPP TS 36.300 V14.3.0 (Jun. 2017), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14), 331 pages.

* cited by examiner

METHOD FOR REPEATEDLY TRANSMITTING DATA AND DEVICE

CROSS-REFERENCE TO RELATED APPLICATIONS

This application is a continuation of International Application No. PCT/CN2018/088845, filed on May 29, 2018, which claims priority to Chinese Patent Application No. 201710653478.8, filed on Aug. 2, 2017. The disclosures of the aforementioned applications are hereby incorporated by reference in their entireties.

TECHNICAL FIELD

This application relates to communications technologies, and in particular, to a method for repeatedly transmitting data and a device.

BACKGROUND

With development of communications technologies, device-to-device (D2D) communication, vehicle-to-vehicle (V2V) communication, vehicle-to-pedestrian (V2P) communication, and vehicle-to-infrastructure/network (V2I/N) communication are technologies for direct communication between terminal devices. V2V, V2P, and V2I/N are collectively referred to as V2X, namely, vehicle-to-everything communication.

Two communication modes are provided in a long term evolution (LTE) V2X standard and a D2D communications standard that are formulated by the 3rd generation partnership project (3GPP). In a first communication mode, communication is performed through a direct side link (SL), so that terminal devices directly communicate with each other. In a second communication mode, communication is performed through forwarding of a network device, a terminal device sends data to the network device through an uplink between the terminal device and the network device, and the network device sends the data to another terminal device through a downlink between the network device and the another terminal device.

However, in a current technology, when the terminal devices communicate with each other through the direct link, a terminal device can send only different data on different logical channels, but the terminal device cannot send same data on different logical channels. Therefore, the data may not be successfully transmitted to another terminal device. Consequently, data transmission reliability cannot be ensured.

SUMMARY

This application provides a method for repeatedly transmitting data and a device, to improve reliability of data transmission performed in a direct link transmission manner.

According to a first aspect, this application provides a method for repeatedly transmitting data, including: separately sending, by a terminal device, one piece of data in a PDCP entity to N logical channels, where a direct link transmission manner is used on at least one of the N logical channels, and N is a positive integer greater than or equal to 2; obtaining, by the terminal device, a resource; and sending, by the terminal device, the data on the N logical channels by using the obtained resource.

In a possible design, the separately sending, by a terminal device, one piece of data in a PDCP entity to N logical channels includes: separately sending, by the terminal device, the data in the PDCP entity to L RLC entities corresponding to the N logical channels, where each of the L RLC entities corresponds to at least one of the N logical channels, different RLC entities in the L RLC entities correspond to different logical channels, and L is a positive integer less than or equal to N; and the sending, by the terminal device, the data on the N logical channels by using the obtained resource includes: sending, by the terminal device by using the obtained resource, the data in the L RLC entities corresponding to the N logical channels.

In a possible design, there is a correspondence between the PDCP entity and the N logical channels; and the correspondence is obtained by the terminal device by using first RRC signaling, or the correspondence is determined by the terminal device.

The obtaining, by the terminal device, a resource includes: receiving, by the terminal device, resource configuration signaling sent by a network device, where the resource configuration signaling is used to indicate a resource dynamically scheduled or semi-dynamically scheduled by the network device for the terminal device; and obtaining the resource; or obtaining, by the terminal device, the resource from any one of a first resource set, a second resource set, and a third resource set, where the first resource set includes at least one resource pool, the second resource set includes at least one resource pool, and the third resource set includes at least one resource pool.

In a possible design, before the separately sending, by a terminal device, one piece of data in a PDCP entity to N logical channels, the method further includes: receiving, by the terminal device, first configuration information sent by the network device, where the first configuration information includes condition information, and the condition information is used to trigger the terminal device to separately send the data in the PDCP entity to the N logical channels.

In a possible design, the condition information includes that a service priority and service priority information meet a first specific relationship; the service priority information is a service priority threshold or a service priority range; when the service priority information is the service priority threshold, the first specific relationship is that the service priority is greater than the service priority threshold, the service priority is equal to the service priority threshold, or the service priority is greater than or equal to the service priority threshold; or when the service priority information is the service priority range, the first specific relationship is that the service priority is within the service priority range; the service priority is a priority of the data or a priority of a MAC PDU that includes the data; and before the obtaining, by the terminal device, a resource, the method further includes: determining, by the terminal device, that the first resource set includes a first resource pool, where the first resource pool is a resource pool corresponding to the service priority information.

In a possible design, the condition information includes that a channel congestion degree of a second resource pool and first channel congestion information meet a second specific relationship; the first channel congestion information is a first channel congestion threshold or a first channel congestion range; when the first channel congestion information is the first channel congestion threshold, the second specific relationship is that the channel congestion degree of the second resource pool is greater than the first channel congestion threshold, the channel congestion degree of the second resource pool is equal to the first channel congestion threshold, or the channel congestion degree of the second resource pool is greater than or equal to the first channel congestion threshold; or when the first channel congestion information is the first channel congestion range, the second specific relationship is that the channel congestion degree of the second resource pool is within the first channel congestion range; and before the obtaining, by the terminal device, a resource, the method further includes: determining, by the terminal device, that the first resource set includes the second resource pool, where the second resource pool is a resource pool corresponding to the first channel congestion information.

In a possible design, the condition information includes that a channel congestion degree of K logical channels and branch channel congestion information meet a third specific relationship; the branch channel congestion information is a branch channel congestion threshold or a branch channel congestion range; when the branch channel congestion information is the branch channel congestion threshold, the third specific relationship is that the channel congestion degree of the K logical channels is greater than the branch channel congestion threshold, the channel congestion degree of the K logical channels is equal to the branch channel congestion threshold, or the channel congestion degree of the K logical channels is greater than or equal to the branch channel congestion threshold; or when the branch channel congestion information is the branch channel congestion range, the third specific relationship is that the channel congestion degree of the K logical channels is within the branch channel congestion range; the channel congestion degree of the K logical channels includes any one of the following: a minimum value in channel congestion degrees of all resource pools used on the K logical channels, a maximum value in the channel congestion degrees of all the resource pools used on the K logical channels, and an average value of the channel congestion degrees of all the resource pools used on the K logical channels; and before the obtaining, by the terminal device, a resource, the method further includes: determining, by the terminal device, that the first resource set includes a third resource pool, where the third resource pool is a resource pool corresponding to the branch channel congestion information.

In a possible design, the condition information includes first indication information; the first indication information points to a resource pool that can be used when the terminal device repeatedly transmits the data; and before the obtaining, by the terminal device, a resource, the method further includes: determining, by the terminal device, that the first resource set includes a fourth resource pool, where the fourth resource pool is a resource pool corresponding to the first indication information.

In a possible design, the condition information includes at least one carrier sequence, each carrier sequence includes at least one carrier, and each carrier sequence points to a resource pool that can be used when the terminal device repeatedly transmits the data; and before the obtaining, by the terminal device, a resource, the method further includes: determining, by the terminal device, that the first resource set includes a fifth resource pool, where the fifth resource pool is a resource pool corresponding to each carrier sequence.

In a possible design, the condition information includes second indication information.

In a possible design, after the terminal device determines a resource pool included in the first resource set, the method further includes: obtaining, by the terminal device, the second resource set from the first resource set based on at least one of terminal location information, terminal speed information, a carrier restriction condition, and a congestion condition, where the second resource set includes M resource pools, and M is an integer greater than or equal to 1, where the terminal location information is used to indicate that the M resource pools meet a location information requirement of the terminal device; the terminal speed information is used to indicate that the M resource pools meet a speed information requirement of the terminal device; the carrier restriction condition is used to indicate that the M resource pools respectively belong to different carriers; the congestion condition includes that a channel congestion degree of the M resource pools and second channel congestion information meet a fourth specific relationship, the second channel congestion information is a second channel congestion threshold or a second channel congestion range, and when the second channel congestion information is the second channel congestion threshold, the fourth specific relationship is that the channel congestion degree of the M resource pools is greater than the second channel congestion threshold, the channel congestion degree of the M resource pools is equal to the second channel congestion threshold, or the channel congestion degree of the M resource pools is greater than or equal to the second channel congestion threshold; or when the second channel congestion information is the second channel congestion range, the fourth specific relationship is that the channel congestion degree of the M resource pools is within the second channel congestion range; and the channel congestion degree of the M resource pools is any one of the following: a minimum value in channel congestion degrees of all of the M resource pools, a maximum value in the channel congestion degrees of all of the M resource pools, and an average value of the channel congestion degrees of all of the M resource pools.

In a possible design, the third resource set is included in second RRC signaling, and the third resource set includes N resource pools.

In a possible design, before the sending, by the terminal device, the data on the N logical channels by using the obtained resource, the method further includes: receiving, by the terminal device, third indication information sent by the network device, where the third indication information represents a transmission mode of each of the N logical channels; or determining, by the terminal device, a transmission mode of each of the N logical channels.

According to a second aspect, this application provides a method for repeatedly transmitting data, including: sending, by a network device, first RRC signaling to a terminal device, where the first RRC signaling includes a correspondence between a PDCP entity and N logical channels, the correspondence is a reference element used by the terminal device to separately send one piece of data in the PDCP entity to the N logical channels, a direct link transmission manner is used on at least one of the N logical channels, and N is a positive integer greater than or equal to 2.

In a possible design, the method further includes: sending, by the network device, resource configuration signaling to the terminal device, where the resource configuration signaling is used to indicate a resource dynamically scheduled or semi-dynamically scheduled by the network device for the terminal device.

In a possible design, before the sending, by a network device, first RRC signaling to a terminal device, the method further includes: sending, by the network device, first configuration information to the terminal device, where the first configuration information includes condition information, and the condition information is used to trigger the terminal device to separately send the data in the PDCP entity to the N logical channels.

In a possible design, the method further includes: sending, by the network device, third indication information to the terminal device, where the third indication information represents a transmission mode of each of the N logical channels.

According to a third aspect, this application provides a terminal device, including: a processor and a transmitter, where the processor is configured to separately send one piece of data in a PDCP entity to N logical channels, where a direct link transmission manner is used on at least one of the N logical channels, and N is a positive integer greater than or equal to 2; the processor is further configured to obtain a resource; and the transmitter is configured to send the data on the N logical channels by using the obtained resource.

In a possible design, the processor is specifically configured to: separately send the data in the PDCP entity to L RLC entities corresponding to the N logical channels, where each of the L RLC entities corresponds to at least one of the N logical channels, different RLC entities in the L RLC entities correspond to different logical channels, and L is a positive integer less than or equal to N; and the transmitter is specifically configured to send, by using the obtained resource, the data in the L RLC entities corresponding to the N logical channels.

In a possible design, there is a correspondence between the PDCP entity and the N logical channels; and the correspondence is obtained by the processor by using first RRC signaling, or the correspondence is determined by the processor.

In a possible design, the terminal device further includes a receiver, and the receiver is configured to: receive resource configuration signaling sent by a network device, where the resource configuration signaling is used to indicate a resource dynamically scheduled or semi-dynamically scheduled by the network device for the terminal device; and obtain the resource; or the processor is specifically configured to obtain the resource from any one of a first resource set, a second resource set, and a third resource set, where the first resource set includes at least one resource pool, the second resource set includes at least one resource pool, and the third resource set includes at least one resource pool.

In a possible design, the receiver is further configured to: before the processor separately sends the data in the PDCP entity to the N logical channels, receive first configuration information sent by the network device, where the first configuration information includes condition information, and the condition information is used to trigger the processor to separately send the data in the PDCP entity to the N logical channels.

In a possible design, the condition information includes that a service priority and service priority information meet a first specific relationship; the service priority information is a service priority threshold or a service priority range; when the service priority information is the service priority threshold, the first specific relationship is that the service priority is greater than the service priority threshold, the service priority is equal to the service priority threshold, or the service priority is greater than or equal to the service priority threshold; or when the service priority information is the service priority range, the first specific relationship is that the service priority is within the service priority range; the service priority is a priority of the data or a priority of a MAC PDU that includes the data; and the processor is further configured to: before the processor obtains the resource, determine that the first resource set includes a first resource pool, where the first resource pool is a resource pool corresponding to the service priority information.

In a possible design, the condition information includes that a channel congestion degree of a second resource pool and first channel congestion information meet a second specific relationship; the first channel congestion information is a first channel congestion threshold or a first channel congestion range; when the first channel congestion information is the first channel congestion threshold, the second specific relationship is that the channel congestion degree of the second resource pool is greater than the first channel congestion threshold, the channel congestion degree of the second resource pool is equal to the first channel congestion threshold, or the channel congestion degree of the second resource pool is greater than or equal to the first channel congestion threshold; or when the first channel congestion information is the first channel congestion range, the second specific relationship is that the channel congestion degree of the second resource pool is within the first channel congestion range; and the processor is further configured to: before the processor obtains the resource, determine that the first resource set includes the second resource pool, where the second resource pool is a resource pool corresponding to the first channel congestion information.

In a possible design, the condition information includes that a channel congestion degree of K logical channels and branch channel congestion information meet a third specific relationship; the branch channel congestion information is a branch channel congestion threshold or a branch channel congestion range; when the branch channel congestion information is the branch channel congestion threshold, the third specific relationship is that the channel congestion degree of the K logical channels is greater than the branch channel congestion threshold, the channel congestion degree of the K logical channels is equal to the branch channel congestion threshold, or the channel congestion degree of the K logical channels is greater than or equal to the branch channel congestion threshold; or when the branch channel congestion information is the branch channel congestion range, the third specific relationship is that the channel congestion degree of the K logical channels is within the branch channel congestion range; the channel congestion degree of the K logical channels includes any one of the following: a minimum value in channel congestion degrees of all resource pools used on the K logical channels, a maximum value in the channel congestion degrees of all the resource pools used on the K logical channels, and an average value of the channel congestion degrees of all the resource pools used on the K logical channels; and the processor is further configured to: before the processor obtains the resource, determine that the first resource set includes a third resource pool, where the third resource pool is a resource pool corresponding to the branch channel congestion information.

In a possible design, the condition information includes first indication information, and the first indication information points to a resource pool that can be used when the terminal device repeatedly transmits the data; and the processor is further configured to: before the processor obtains the resource, determine that the first resource set includes a fourth resource pool, where the fourth resource pool is a resource pool corresponding to the first indication information.

In a possible design, the condition information includes at least one carrier sequence, each carrier sequence includes at least one carrier, and each carrier sequence points to a resource pool that can be used when the terminal device repeatedly transmits the data; and the processor is further configured to: before the processor obtains the resource, determine that the first resource set includes a fifth resource pool, where the fifth resource pool is a resource pool corresponding to each carrier sequence.

In a possible design, the condition information includes second indication information.

In a possible design, the processor is further configured to: after the processor determines a resource pool included in the first resource set, obtain the second resource set from the first resource set based on at least one of terminal location information, terminal speed information, a carrier restriction condition, and a congestion condition, where the second resource set includes M resource pools, and M is an integer greater than or equal to 1, where the terminal location information is used to indicate that the M resource pools meet a location information requirement of the terminal device; the terminal speed information is used to indicate that the M resource pools meet a speed information requirement of the terminal device; the carrier restriction condition is used to indicate that the M resource pools respectively belong to different carriers; the congestion condition includes that a channel congestion degree of the M resource pools and second channel congestion information meet a fourth specific relationship, the second channel congestion information is a second channel congestion threshold or a second channel congestion range, and when the second channel congestion information is the second channel congestion threshold, the fourth specific relationship is that the channel congestion degree of the M resource pools is greater than the second channel congestion threshold, the channel congestion degree of the M resource pools is equal to the second channel congestion threshold, or the channel congestion degree of the M resource pools is greater than or equal to the second channel congestion threshold; or when the second channel congestion information is the second channel congestion range, the fourth specific relationship is that the channel congestion degree of the M resource pools is within the second channel congestion range; and the channel congestion degree of the M resource pools is any one of the following: a minimum value in channel congestion degrees of all of the M resource pools, a maximum value in the channel congestion degrees of all of the M resource pools, and an average value of the channel congestion degrees of all of the M resource pools.

In a possible design, the third resource set is included in second RRC signaling, and the third resource set includes N resource pools.

In a possible design, the receiver is further configured to: before the processor sends the data on the N logical channels by using the obtained resource, receive third indication information sent by the network device, where the third indication information represents a transmission mode of each of the N logical channels; or the processor is further configured to determine a transmission mode of each of the N logical channels before the processor sends the data on the N logical channels by using the obtained resource.

According to a fourth aspect, this application provides a network device, including: a transmitter, where the transmitter is configured to send first RRC signaling to a terminal device, where the first RRC signaling includes a correspondence between a PDCP entity and N logical channels, the correspondence is a reference element used by the terminal device to separately send one piece of data in the PDCP entity to the N logical channels, a direct link transmission manner is used on at least one of the N logical channels, and N is a positive integer greater than or equal to 2.

In a possible design, the transmitter is further configured to: send resource configuration signaling to the terminal device, where the resource configuration signaling is used to indicate a resource dynamically scheduled or semi-dynamically scheduled by the network device for the terminal device.

In a possible design, the transmitter is further configured to: send first configuration information to the terminal device before the transmitter sends the first RRC signaling to the terminal device, where the first configuration information includes condition information, and the condition information is used to trigger the terminal device to separately send the data in the PDCP entity to the N logical channels.

In a possible design, the transmitter is further configured to: send third indication information to the terminal device, where the third indication information represents a transmission mode of each of the N logical channels.

According to a fifth aspect, this application provides a terminal device, and the terminal device includes a module configured to perform the method in any one of the first aspect or the possible implementations of the first aspect.

According to a sixth aspect, this application provides a network device, and the network device includes a module configured to perform the method in any one of the second aspect or the possible implementations of the second aspect.

According to a seventh aspect, this application provides a terminal device, including at least one processing element or chip configured to perform any method in the first aspect.

According to an eighth aspect, this application provides a program, and the program is used to perform any method in the first aspect when being executed by a processor.

According to a ninth aspect, this application provides a computer-readable storage medium, including the program in the eighth aspect.

According to a tenth aspect, this application provides a network device, including at least one processing element or chip configured to perform any method in the second aspect.

According to an eleventh aspect, this application provides a program, and the program is used to perform any method in the second aspect when being executed by a processor.

According to a twelfth aspect, this application provides a computer-readable storage medium, including the program in the eleventh aspect.

It can be learned that, in the foregoing aspects, the terminal device sends the data in the PDCP entity to the N logical channels, where the direct link transmission manner is used on the at least one of the N logical channels, and N is a positive integer greater than or equal to 2; the terminal device obtains the resource; and the terminal device sends the data on the N logical channels by using the obtained resource. Therefore, when terminal devices communicate with each other in a direct link manner, the terminal device separately sends the data in the PDCP entity to the N logical channels, so that the terminal device can send the data on the N logical channels by using the obtained resource. In this way, the terminal device can send same data on a plurality of logical channels on a direct link, so that reliability of data transmission performed in the direct link transmission manner can be ensured.

DETAILED DESCRIPTION OF ILLUSTRATIVE EMBODIMENTS

The embodiments of this application are applied to a 5G communications system or another system that may emerge in the future. The following describes some terms used in this application, to facilitate understanding of a person skilled in the art. It should be noted that, when solutions in the embodiments of this application are applied to the 5G system or the another system that may emerge in the future, names of a network device and a terminal device may change, but this does not affect implementation of the solutions in the embodiments of this application.

(1) A terminal device is a device that provides voice and/or data connectivity for a user. The terminal device in this application mainly includes but is not limited to a vehicle terminal, a vehicle-mounted terminal, a vehicle device, a mobile terminal, a common terminal, and the like. The vehicle-mounted terminal includes but is not limited to a vehicle-mounted navigator and the like, and the mobile terminal includes but is not limited to a mobile phone, a wearable device, a tablet computer, and the like.

(2) A network device, also referred to as a radio access network (Radio Access Network, RAN) device, is a device that connects a terminal device and a wireless network, and includes devices in various communications standards. For example, the network device includes but is not limited to a base station (for example, a gNB), a radio network controller (RNC), a NodeB (NB), a base station controller (BSC), a BTS, an HeNB (Home evolved NodeB), an HNB (Home Node B), a baseband unit (BBU), and the like.

(3) "A plurality of" means two or more, and another quantifier is similar to this. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

Figure 1:
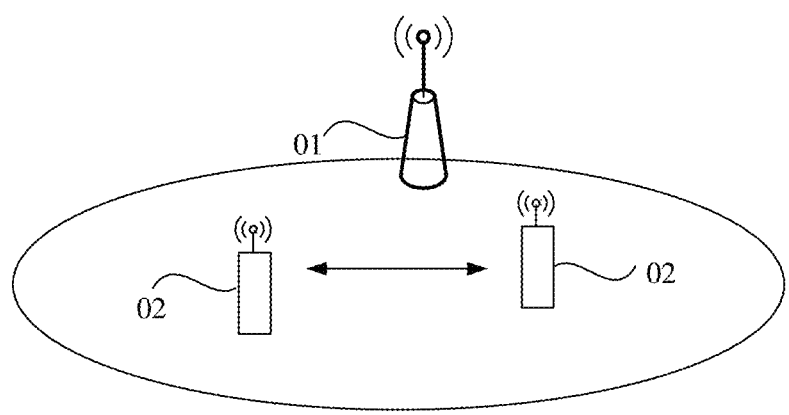
FIG. 1 is a schematic diagram 1 of an application scenario according to an embodiment of this application.

FIG. 1 is a schematic diagram 1 of an application scenario according to an embodiment of this application. A networking architecture shown in FIG. 1 mainly includes a network device 01 and a terminal device 02. For example, the terminal device 02 may be a vehicle terminal. As shown in FIG. 1, when V2V communication is performed in a direct link manner, terminal devices 02 directly communicate with each other. A resource for communication between the terminal devices 02 is configured by the network device or is preconfigured.

Figure 2:
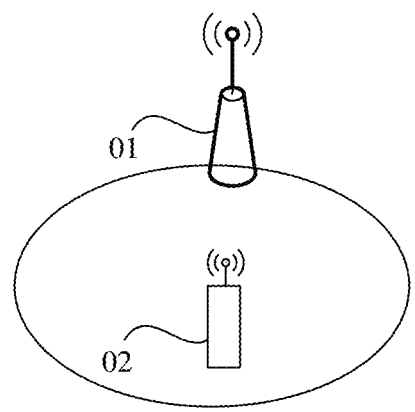
FIG. 2 is a schematic diagram 2 of an application scenario according to an embodiment of this application.

FIG. 2 is a schematic diagram 2 of an application scenario according to an embodiment of this application. A networking architecture shown in FIG. 2 mainly includes a network device 01 and a terminal device 02. For example, the terminal device 02 may be a vehicle terminal. Before terminal devices 02 in FIG. 2 directly communicate with each other, the network device 01 may configure the terminal device 02, to configure a manner in which the terminal device 02 obtains a resource and sends data.

Figure 3:
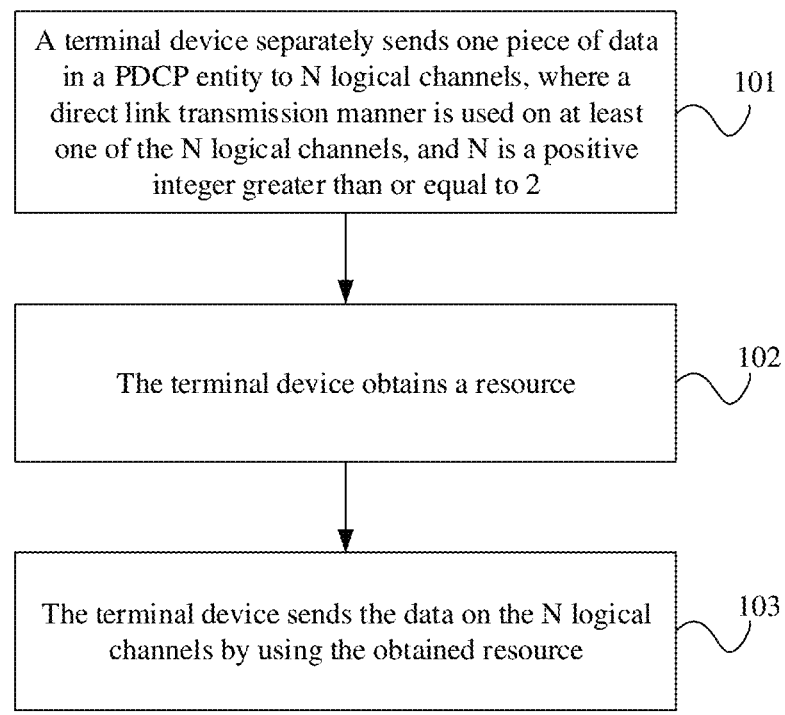
FIG. 3 is a schematic flowchart of a method for repeatedly transmitting data according to an embodiment of this application.

FIG. 3 is a schematic flowchart of a method for repeatedly transmitting data according to an embodiment of this application. As shown in FIG. 3, the method includes the following steps.

101. A terminal device separately sends one piece of data in a packet data convergence protocol (packet data convergence protocol, PDCP) entity to N logical channels, where a direct link transmission manner is used on at least one of the N logical channels, and N is a positive integer greater than or equal to 2.

In a possible implementation, there is a correspondence between the PDCP entity and the N logical channels. The correspondence is obtained by the terminal device by using first radio resource control (RRC) signaling, or the correspondence is determined by the terminal device.

In a possible implementation, the data in the PDCP entity may be one data packet.

In an optional implementation, step 101 specifically includes: separately sending, by the terminal device, the data in the PDCP entity to L radio link control (RLC) entities corresponding to the N logical channels, where each of the L RLC entities corresponds to at least one of the N logical channels, different RLC entities in the L RLC entities correspond to different logical channels, and L is a positive integer less than or equal to N.

In this embodiment, the terminal device first needs to determine the correspondence between the PDCP entity and the N logical channels. The terminal device determines the correspondence between the PDCP entity and the N logical channels in the following several manners.

A manner 1 in which the terminal device determines the correspondence between the PDCP entity and the N logical channels is as follows.

A network device may send a plurality of pieces of first RRC signaling to the terminal device, and each piece of first RRC signaling includes a correspondence between the PDCP entity and at least one of the N logical channels. The terminal device receives the plurality of pieces of first RRC signaling sent by the network device, and then the terminal device obtains the correspondence between the PDCP entity and the N logical channels by using the plurality of pieces of first RRC signaling. The plurality of pieces of first RRC signaling may be sent by using one message, or may be sent by using a plurality of messages.

In the manner 1, specifically, the correspondence between the PDCP entity and the N logical channels may be implicit or explicit. In a feasible embodiment, when the correspondence between the PDCP entity and the N logical channels is implicit, the network device sends a plurality of pieces of first configuration signaling to the terminal device. Each piece of first configuration signaling includes PDCP configuration information and at least one piece of logical channel configuration information, and the logical channel configuration information includes at least one of a logical channel identifier and logical channel priority information. In addition, usually, one piece of PDCP configuration information corresponds to one PDCP entity, and one piece of logical channel configuration information corresponds to one logical channel. In this case, the correspondence between the PDCP entity and the N logical channels can be obtained. Alternatively, when the correspondence between the PDCP entity and the N logical channels is explicit, the network device sends a plurality of pieces of first configuration signaling to the terminal device. Names of the plurality of pieces of first configuration signaling, names of elements in the plurality of pieces of first configuration signaling, or the like indicate the correspondence between the PDCP entity and the N logical channels. Then, the correspondence between the PDCP entity and the N logical channels can be obtained. The first configuration signaling herein is RRC signaling, and N is a positive integer greater than or equal to 2.

In addition, there is a correspondence between the N logical channels and the L RLC entities, each of the L RLC entities corresponds to the at least one of the N logical channels, and different RLC entities in the L RLC entities correspond to different logical channels. In other words, a logical channel corresponding to an $i^{th}$ RLC entity in the L RLC entities is different from a logical channel corresponding to a $j^{th}$ RLC entity in the L RLC entities. Herein, L may be a positive integer less than or equal to N, i is an integer greater than 0 and not greater than L, j is an integer greater than 0 and not greater than L, and i is not equal to j. Specifically, logical channels may be in a one-to-one correspondence with RLC entities. In other words, one logical channel corresponds to one RLC entity. Alternatively, logical channels may be in a many-to-one correspondence with an RLC entity. In other words, a plurality of logical channels correspond to one RLC entity. This is not limited in this application. The correspondence between the N logical channels and the L RLC entities may be implicit or explicit.

In a feasible embodiment, when the correspondence between the N logical channels and the L RLC entities is implicit, the network device sends a plurality of pieces of second configuration signaling to the terminal device. Each piece of second configuration signaling includes N pieces of logical channel configuration information and L pieces of RLC configuration information, and the logical channel configuration information includes at least one of a logical channel identifier and logical channel priority information. The correspondence between the N logical channels and the L RLC entities can be obtained by using the plurality of pieces of second configuration signaling. Alternatively, when the correspondence between the N logical channels and the L RLC entities is explicit, the network device sends a plurality of pieces of second configuration signaling to the terminal device. Names of the plurality of pieces of second configuration signaling, names of elements in the plurality of pieces of second configuration signaling, or the like indicate the correspondence between the N logical channels and the L RLC entities. Then, the correspondence between the N logical channels and the L RLC entities can be obtained. The second configuration signaling herein is RRC signaling. Optionally, the RRC signaling may alternatively be a system information block (system information block, SIB). The second configuration signaling may be the same as or different from the first configuration signaling. The RRC signaling and/or the SIB herein are/is a generalized concept. For example, both the first RRC signaling and second RRC signaling in this application are RRC signaling.

A manner 2 in which the terminal device determines the correspondence between the PDCP entity and the N logical channels is as follows:

A network device sends one piece of first RRC signaling to the terminal device, and the first RRC signaling includes the correspondence between the PDCP entity and the N logical channels. The terminal device receives the first RRC signaling sent by the network device, and then the terminal device obtains the correspondence between the PDCP entity and the N logical channels by using the first RRC signaling.

In the manner 2, specifically, the correspondence between the PDCP entity and the N logical channels may be implicit or explicit. In a feasible embodiment, when the correspondence between the PDCP entity and the N logical channels is implicit, the network device sends one piece of third configuration signaling to the terminal device. The third configuration signaling includes PDCP configuration information and logical channel configuration information of each of the N logical channels, and the logical channel configuration information includes at least one of a logical channel identifier and logical channel priority information. In addition, usually, one piece of PDCP configuration information corresponds to one PDCP entity, and one piece of logical channel configuration information corresponds to one logical channel. In this case, the correspondence between the PDCP entity and the N logical channels can be obtained. Alternatively, when the correspondence between the PDCP entity and the N logical channels is explicit, the network device sends one piece of third configuration signaling to the terminal device. A name of the third configuration signaling, a name of an element in the third configuration signaling, or the like indicates the correspondence between the PDCP entity and the N logical channels. Then, the correspondence between the PDCP entity and the N logical channels can be obtained. The third configuration signaling herein is RRC signaling.

In addition, there is a correspondence between the N logical channels and the L RLC entities, each of the L RLC entities corresponds to the at least one of the N logical channels, and different RLC entities in the L RLC entities correspond to different logical channels. In other words, a logical channel corresponding to an $i^{th}$ RLC entity in the L RLC entities is different from a logical channel corresponding to a $j^{th}$ RLC entity in the L RLC entities. Herein, L may be a positive integer less than or equal to N, i is an integer greater than 0 and not greater than L, j is an integer greater than 0 and not greater than L, and i is not equal to j. Specifically, logical channels may be in a one-to-one correspondence with RLC entities. In other words, one logical channel corresponds to one RLC entity. Alternatively, logical channels may be in a many-to-one correspondence with an RLC entity. In other words, a plurality of logical channels correspond to one RLC entity. This is not limited in this application. The correspondence between the N logical channels and the L RLC entities may be implicit or explicit.

In a feasible embodiment, when the correspondence between the N logical channels and the L RLC entities is implicit, the network device sends one piece of fourth configuration signaling to the terminal device. The fourth configuration signaling includes N pieces of logical channel configuration information and L pieces of RLC configuration information, and the logical channel configuration information includes at least one of a logical channel identifier and logical channel priority information. The correspondence between the N logical channels and the L RLC entities can be obtained by using the fourth configuration signaling. Alternatively, when the correspondence between the N logical channels and the L RLC entities is explicit, the network device sends one piece of fourth configuration signaling to the terminal device. A name of the fourth configuration signaling, a name of an element in the fourth configuration signaling, or the like indicates the correspondence between the N logical channels and the L RLC entities. Then, the correspondence between the N logical channels and the L RLC entities can be obtained. The fourth configuration signaling may be the same as or different from the third configuration signaling, and a value of L may be the same as or different from a value of N. The fourth configuration signaling herein is RRC signaling. Optionally, the RRC signaling may alternatively be a SIB. The RRC signaling and/or the SIB herein are/is a generalized concept. For example, both the first RRC signaling and second RRC signaling in this application are RRC signaling.

A manner 3 in which the terminal device determines a correspondence between the PDCP entity and a plurality of RLC entities is as follows:

The terminal device independently determines the correspondence between the PDCP entity and the N logical channels.

In the manner 3, specifically, the terminal device may independently determine the correspondence between the PDCP entity and the N logical channels. Optionally, the terminal device may determine the correspondence based on preconfigured information. The preconfigured information is information preconfigured on the terminal device.

In addition, the terminal device independently determines a correspondence between the N logical channels and the L RLC entities. Optionally, the terminal device may determine the correspondence between the N logical channels and the L RLC entities based on preconfigured information. The preconfigured information is information preconfigured on the terminal device.

Then, the terminal device separately sends the data in the PDCP entity to the N logical channels. In addition, the direct link transmission manner is used on the at least one of the N logical channels. Specifically, the terminal device separately sends the data in the PDCP entity to the L RLC entities corresponding to the N logical channels. Herein, because there is the correspondence between the N logical channels and the L RLC entities, when the terminal device sends the data in the PDCP entity to the L RLC entities corresponding to the N logical channels in step 101, the data in the PDCP entity is sent to the N logical channels.

For example, N is 2, L is 2, a logical channel 1 corresponds to an RLC entity 1, and a logical channel 2 corresponds to an RLC entity 2. The terminal device sends data 1 in the PDCP entity to the RLC entity 1 and the RLC entity 2. In other words, the terminal device sends the data 1 in the PDCP entity to the logical channel 1 and the logical channel 2. The direct link transmission manner is used on the logical channel 1.

For another example, N is 3, L is 2, a logical channel 1 corresponds to an RLC entity 1, and a logical channel 2 and a logical channel 3 correspond to an RLC entity 2. The terminal device sends data 1 in the PDCP entity to the RLC entity 1 and the RLC entity 2. In other words, the terminal device sends the data 1 in the PDCP entity to the logical channel 1, the logical channel 2, and the logical channel 3. The direct link transmission manner is used on the logical channel 1.

102. The terminal device obtains a resource.

In this embodiment, the terminal device needs to obtain the resource for sending the data.

103. The terminal device sends the data on the N logical channels by using the obtained resource.

In an optional implementation, step 103 specifically includes: sending, by the terminal device by using the obtained resource, the data in the L RLC entities corresponding to the N logical channels.

In this embodiment, the terminal device sends the data on the N logical channels by using the resource obtained in step 102.

Specifically, a media access control layer needs to encapsulate data on one or more logical channels into a media access control protocol data unit (MAC PDU) based on at least one of a size of the obtained resource, a logical channel priority, and a data encapsulation rule. The MAC PDU includes data on the at least one of the N logical channels. A rule for encapsulating the data on the one or more logical channels into the MAC PDU is not limited in this application. For example, because the terminal device may have more than N logical channels, the terminal device may encapsulate data on a specific logical channel in the N logical channels and data on a specific logical channel other than the N logical channels into one MAC PDU. Alternatively, the terminal device may encapsulate a plurality of logical channels in the N logical channels into one MAC PDU. Alternatively, the terminal device encapsulates data on only one of the N logical channels. Another possible form is not listed herein in this application.

In an optional embodiment, to obtain a frequency domain diversity gain, it may be required that the data on the N logical channels is separately loaded on N different carrier resources. For example, if N is 2, it is required that data on a logical channel 1 and data on a logical channel 2 are respectively loaded on a resource on a carrier 1 and a resource on a carrier 2. When the obtained resource is the resource on the carrier 1, the data on the logical channel 2 cannot be loaded into a MAC PDU corresponding to the resource on the carrier 1. In addition, the MAC layer may encapsulate one or more MAC PDUs. Encapsulating data on a specific logical channel into an MAC PDU is encapsulating data in an RLC entity corresponding to the logical channel into the MAC PDU. Then, the terminal device may send, by using the obtained resource, the one or more MAC PDUs obtained after the encapsulation. In other words, the terminal device sends the data on the N logical channels. In this case, the data in the L RLC entities is sent.

Figure 4:
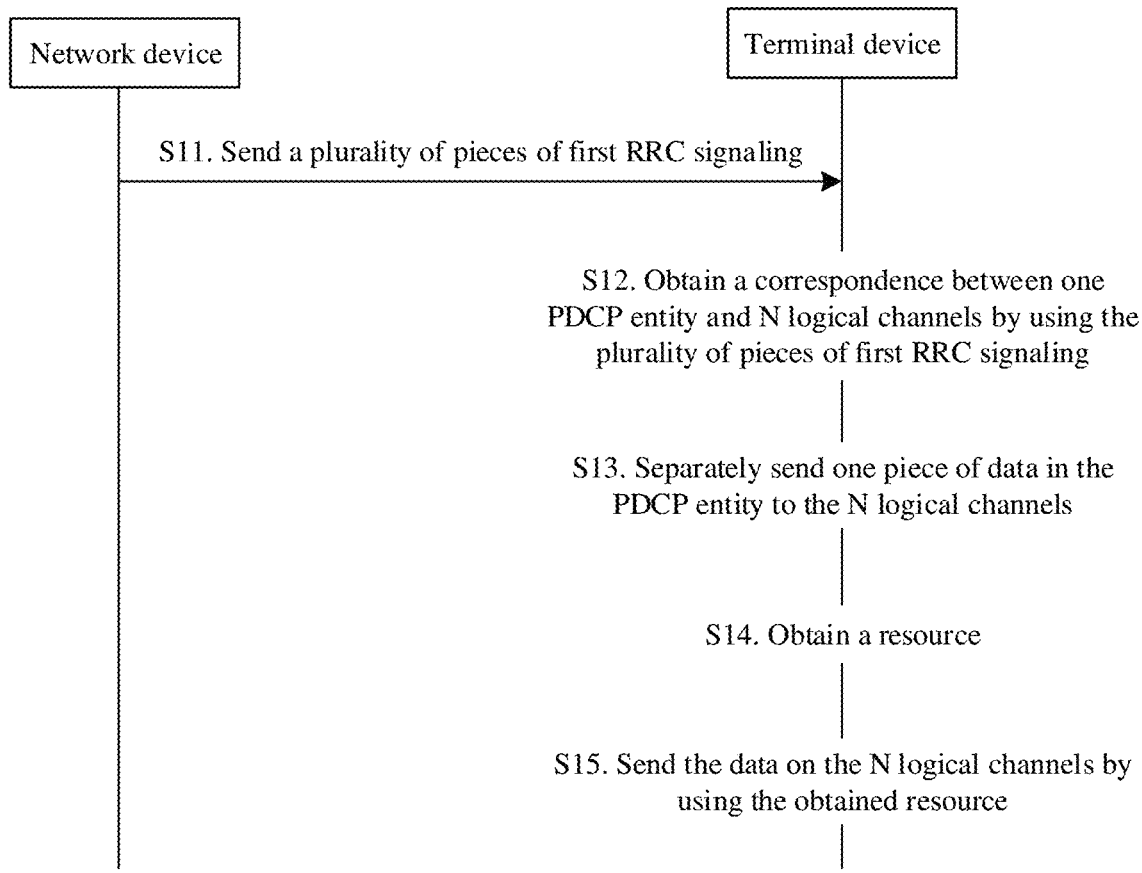
FIG. 4 is a signaling diagram 1 of a method for repeatedly transmitting data according to an embodiment of this application.

FIG. 4 is a signaling diagram 1 of a method for repeatedly transmitting data according to an embodiment of this application, and is used to implement the steps in FIG. 3. As shown in FIG. 4, the method includes the following steps.

S11. A network device sends a plurality of pieces of first RRC signaling to a terminal device, where each piece of first RRC signaling includes a correspondence between one PDCP entity and N logical channels, the N logical channels correspond to L RLC entities, N is a positive integer greater than or equal to 2, and L is a positive integer less than or equal to N.

S12. The terminal device obtains the correspondence between one PDCP entity and N logical channels by using the plurality of pieces of first RRC signaling.

S13. The terminal device separately sends one piece of data in the PDCP entity to the N logical channels, where a direct link transmission manner is used on at least one of the N logical channels.

S14. The terminal device obtains a resource.

S15. The terminal device sends the data on the N logical channels by using the obtained resource.

Herein, the manner 1 in which the terminal device determines the correspondence between the PDCP entity and the N logical channels in step 101 in FIG. 3 is implemented in step S11 and step S12. For S13, refer to step 101 in FIG. 3, for S14, refer to step 102 in FIG. 3, and for S15, refer to step 103 in FIG. 3. Details are not described herein again.

Figure 5:
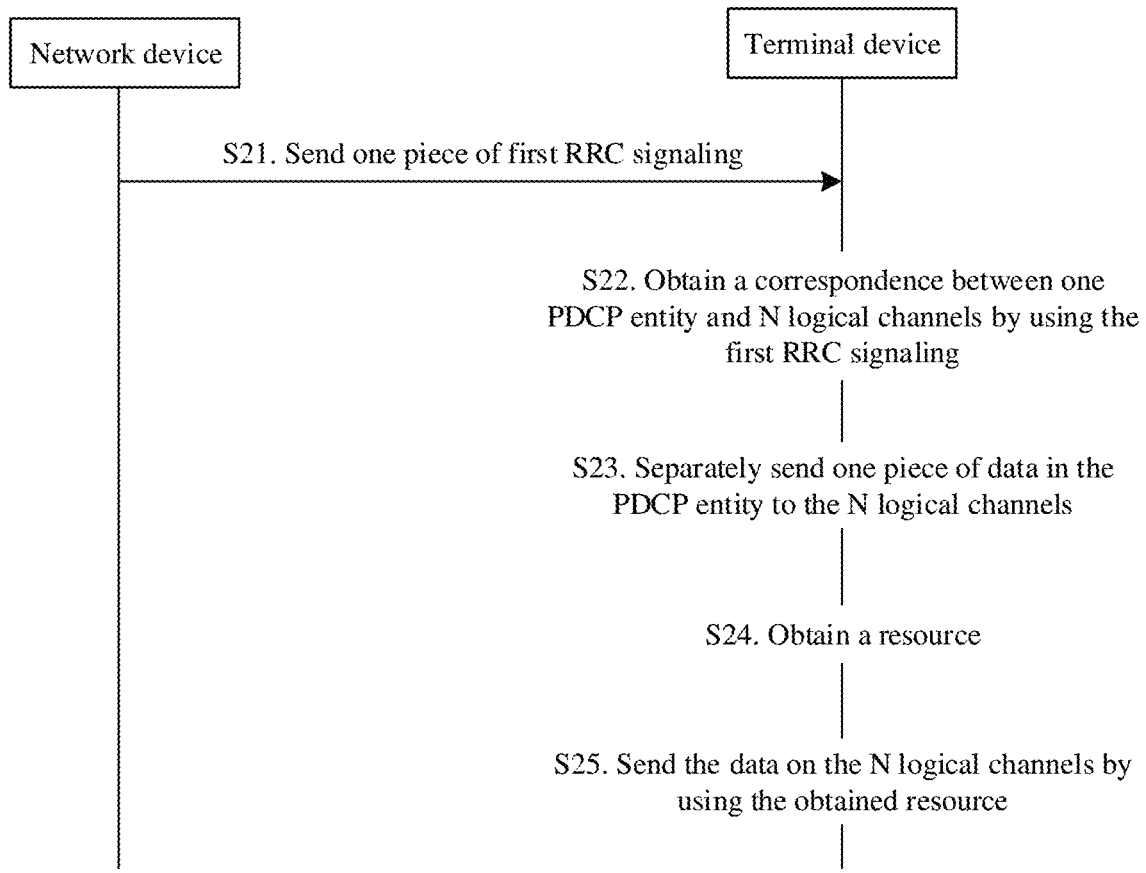
FIG. 5 is a signaling diagram 2 of a method for repeatedly transmitting data according to an embodiment of this application.

FIG. 5 is a signaling diagram 2 of a method for repeatedly transmitting data according to an embodiment of this application, and is used to implement the steps in FIG. 3. As shown in FIG. 5, the method includes the following steps:

S21. A network device sends one piece of first RRC signaling to a terminal device, where the first RRC signaling includes a correspondence between one PDCP entity and N logical channels, the N logical channels correspond to L RLC entities, N is a positive integer greater than or equal to 2, and L is a positive integer less than or equal to N.

S22. The terminal device obtains the correspondence between one PDCP entity and N logical channels by using the first RRC signaling.

S23. The terminal device separately sends one piece of data in the PDCP entity to the N logical channels, where a direct link transmission manner is used on at least one of the N logical channels.

S24. The terminal device obtains a resource.

S25. The terminal device sends the data on the N logical channels by using the obtained resource.

Herein, the manner 2 in which the terminal device determines the correspondence between the PDCP entity and the N logical channels in step 101 in FIG. 3 is implemented in step S21 and step S22. For S23, refer to step 101 in FIG. 3, for S24, refer to step 102 in FIG. 3, and for S25, refer to step 103 in FIG. 3. Details are not described herein again.

Figure 6:
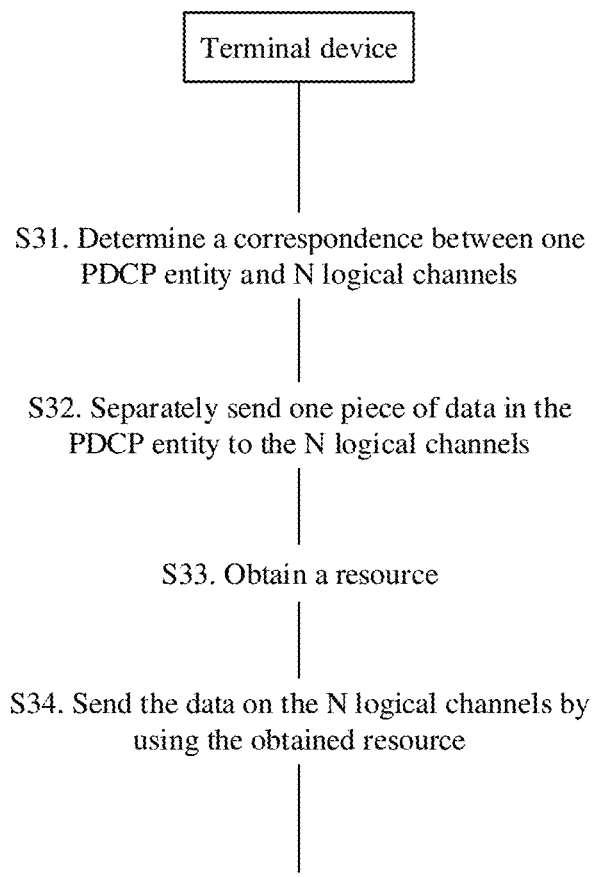
FIG. 6 is a signaling diagram 3 of a method for repeatedly transmitting data according to an embodiment of this application.

FIG. 6 is a signaling diagram 3 of a method for repeatedly transmitting data according to an embodiment of this application, and is used to implement the steps in FIG. 3. As shown in FIG. 6, the method includes the following steps:

S31. A terminal device determines a correspondence between one PDCP entity and N logical channels, where the N logical channels correspond to L RLC entities, N is a positive integer greater than or equal to 2, and L is a positive integer less than or equal to N.

S32. The terminal device separately sends one piece of data in the PDCP entity to the N logical channels, where a direct link transmission manner is used on at least one of the N logical channels.

S33. The terminal device obtains a resource.

S34. The terminal device sends the data on the N logical channels by using the obtained resource.

Herein, the manner 3 in which the terminal device determines the correspondence between the PDCP entity and the N logical channels in step 101 in FIG. 3 is implemented in step S31. For S32, refer to step 101 in FIG. 3, for S33, refer to step 102 in FIG. 3, and for S34, refer to step 103 in FIG. 3. Details are not described herein again.

In the embodiments, the terminal device separately sends the data in the PDCP entity to the N logical channels, where the direct link transmission manner is used on the at least one of the N logical channels, and N is a positive integer greater than or equal to 2; the terminal device obtains the resource; and the terminal device sends the data on the N logical channels by using the obtained resource. Optionally, each of the L RLC entities corresponds to at least one of the N logical channels, different RLC entities in the L RLC entities correspond to different logical channels, and L is a positive integer less than or equal to N. There is the correspondence between the L RLC entities and the N logical channels. Therefore, when terminal devices communicate with each other in a direct link manner, if the terminal device separately sends the data in the PDCP entity to the L RLC entities corresponding to the N logical channels, the data in the PDCP entity is sent to the N logical channels, so that the terminal device can send the data on the N logical channels by using the obtained resource. In this way, the terminal device can send same data on a plurality of logical channels on a direct link, so that reliability of data transmission performed in the direct link transmission manner can be ensured.

Optionally, according to the foregoing embodiments, before step 103, the method further includes step 104.

104. The terminal device receives third indication information sent by the network device, where the third indication information represents a transmission mode of each of the N logical channels; or the terminal device determines a transmission mode of each of the N logical channels.

In this embodiment, the network device sends the third indication information to the terminal device, and the third indication information indicates respective transmission modes of the N logical channels. Alternatively, the terminal device independently determines respective transmission modes of the N logical channels. The transmission mode of each of the N logical channels may be one of a unicast mode, a multicast mode, and a broadcast mode.

In an optional embodiment, a same transmission mode may be used on the N logical channels.

In an optional embodiment, the transmission mode of each logical channel may be reflected by using a destination address of a data packet on the logical channel. For example, if the destination address is a unicast address, the transmission mode of the logical channel is the unicast mode; if the destination address is a multicast address, the transmission mode of the logical channel is the multicast mode; or if the destination address is a broadcast address, the transmission mode of the logical channel is the broadcast mode.

In an optional embodiment, the transmission mode of each logical channel may be reflected by using a service type of a data packet on the logical channel. For example, if the service type of the data packet is a unicast transmission mode, the corresponding transmission mode of the logical channel is the unicast mode; if the service type of the data packet is a multicast transmission mode, the corresponding transmission mode of the logical channel is the multicast mode; or if the service type of the data packet is a broadcast transmission mode, the corresponding transmission mode of the logical channel is the broadcast mode.

In an optional embodiment, the transmission mode of each logical channel may be reflected by using a quality of service flow (Qos flow) corresponding to a data packet on the logical channel. For example, the Qos flow may be in a correspondence with a latency requirement, a reliability requirement, a transmission mode, and the like of a service. If an identifier of the Qos flow corresponding to the data packet represents a unicast transmission mode, the corresponding transmission mode of the logical channel is the unicast mode; if the identifier of the Qos flow corresponding to the data packet represents a multicast transmission mode, the corresponding transmission mode of the logical channel is the multicast mode; or if the identifier of the Qos flow corresponding to the data packet represents a broadcast transmission mode, the corresponding transmission mode of the logical channel is the broadcast mode.

Figure 7:
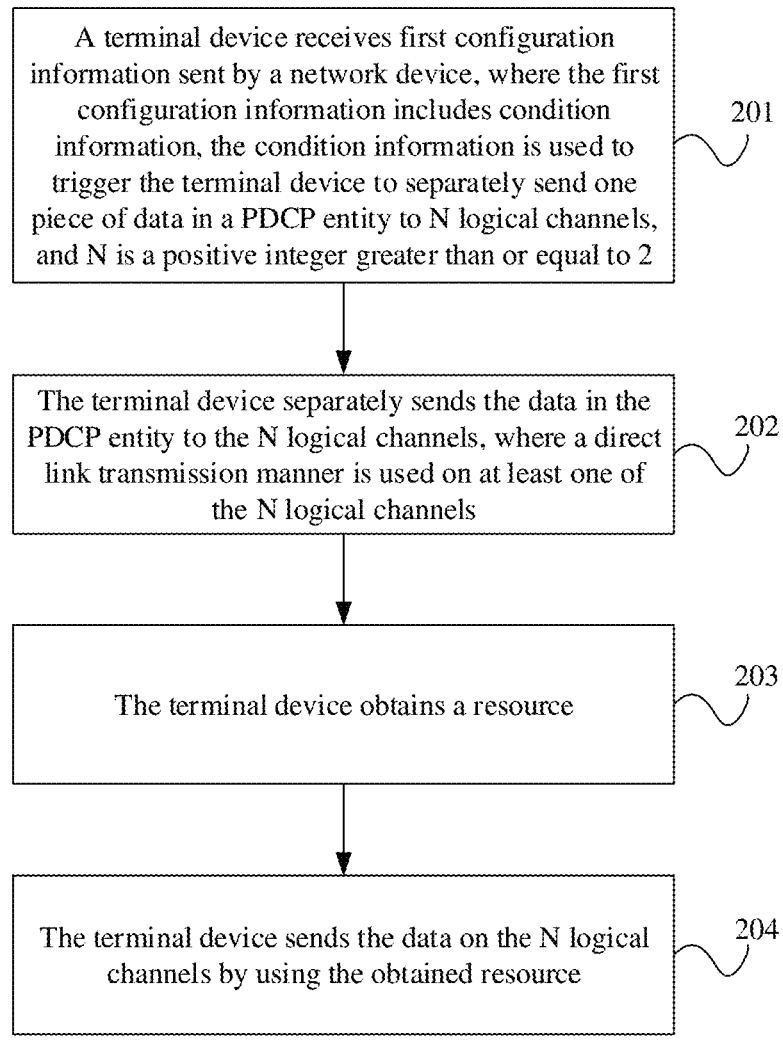
FIG. 7 is a schematic flowchart of another method for repeatedly transmitting data according to an embodiment of this application.

FIG. 7 is a schematic flowchart of another method for repeatedly transmitting data according to an embodiment of this application. As shown in FIG. 7, the method includes the following steps.

201. A terminal device receives first configuration information sent by a network device, where the first configuration information includes condition information, the condition information is used to trigger the terminal device to separately send one piece of data in a PDCP entity to N logical channels, and N is a positive integer greater than or equal to 2.

In this embodiment, the network device sends the first configuration information to the terminal device, and the first configuration information includes the condition information that the terminal device can perform step 202.

The condition information included in the first configuration information in step 201 includes the following several implementations.

(1) Implementation 1 of step 201: The condition information includes that a service priority and service priority information meet a first specific relationship.

The service priority information is a service priority threshold or a service priority range.

When the service priority information is the service priority threshold, the first specific relationship is that the service priority is greater than the service priority threshold, the service priority is equal to the service priority threshold, or the service priority is greater than or equal to the service priority threshold; or when the service priority information is the service priority range, the first specific relationship is that the service priority is within the service priority range.

The service priority is a priority of the data or a priority of a MAC PDU that includes the data.

In this case, after step 201, the terminal device determines that a first resource set includes a first resource pool, and the first resource pool is a resource pool corresponding to the service priority information.

In this embodiment, the network device sends the first configuration information to the terminal device, the first configuration information includes the condition information, and the condition information is that the service priority and the service priority information meet the first specific relationship.

The service priority information may be the service priority threshold. In this case, the condition information is represented as follows: Only when the service priority is greater than the service priority threshold, the service priority is equal to the service priority threshold, or the service priority is greater than or equal to the service priority threshold, the terminal device is triggered to perform step 202. Alternatively, the service priority information may be the service priority range. In this case, the condition information is represented as follows. Only when the service priority is within the service priority range, the terminal device is triggered to perform step 202.

Herein, the service priority is the priority of the data in the PDCP entity in step 202, or the service priority is the priority of the MAC PDU that includes the data in the PDCP entity in step 202. An RLC layer may need to divide the data, and a MAC layer may need to perform logical channel multiplexing. Therefore, the service priority herein may be the priority of the MAC PDU that includes the divided data.

In an optional embodiment, the service priority of the data may alternatively be a quality of service flow identifier corresponding to the data in the PDCP entity. The quality of service flow identifier may correspond to a latency requirement, a reliability requirement, a transmission mode, and the like of a service, and may reflect a quality of service requirement of the data. The terminal device performs step 202 only when the quality of service flow identifier and the service priority information meet the first specific relationship. Specifically, when the service priority information is the service priority threshold, the service priority threshold is a quality of service flow identifier A. For example, the first specific relationship is represented as follows: The quality of service flow identifier of the service data is greater than the quality of service flow identifier A. Then, when determining that the quality of service flow identifier of the data is greater than the quality of service flow identifier A represented by the service priority threshold, the terminal device performs step 202. Alternatively, when the service priority information is the service priority range, the service priority range is a quality of service flow identifier range. For example, the quality of service flow identifier range may include but is not limited to any one of [A, B], [A, B), (A, B], (A, B), and {A, B, C}. Herein, [A, B] indicates "greater than or equal to A and less than or equal to B", (A, B) indicates "greater than A and less than B", and {A, B, C} indicates that only an identifier A, an identifier B, and an identifier C are allowed. Then, when determining that the quality of service flow identifier of the data meets a requirement of the quality of service flow identifier range, the terminal device performs step 202. Then, the terminal device may determine that the first resource set includes at least one first resource pool, and each resource pool is a resource pool corresponding to the service priority information. Herein, a correspondence between service priority information and a resource pool may be implicit or explicit. Specifically, when the correspondence between service priority information and a resource pool is implicit, the correspondence is implicitly described by using at least one piece of configuration information; or when the correspondence between service priority information and a resource pool is explicit, the correspondence is indicated by using a name of configuration information or a name of an element in the configuration information. The configuration information may be carried by using RRC signaling. Optionally, the RRC signaling may be a SIB. The configuration information herein is a generalized concept. For example, the first configuration information and other configuration information below are all configuration information. The RRC signaling and/or the SIB herein are/is also a generalized concept. For example, both first RRC signaling and second RRC signaling in this application are RRC signaling.

In an optional embodiment, the first configuration information further includes at least one piece of resource pool information, and each piece of resource pool information is used to represent one resource pool. If one piece of resource pool information includes one piece of service priority information, there is a correspondence between the service priority information and a resource pool represented by the resource pool information. Therefore, the terminal device can determine the first resource pool corresponding to the service priority information.

In an optional embodiment, the first configuration information further includes at least one piece of carrier information, one piece of carrier information corresponds to one carrier, and each piece of carrier information points to at least one resource pool that belongs to a carrier corresponding to the carrier information. In addition, if one piece of carrier information includes one piece of service priority information, there is a correspondence between the service priority information and a resource pool indicated by the carrier information. Therefore, the terminal device can determine the first resource pool corresponding to the service priority information.

In an optional embodiment, the first configuration information further includes the service priority information and a plurality of pieces of resource pool information, each piece of resource pool information is used to represent one resource pool, and the first configuration information indicates a plurality of resource pools that can be represented by using the plurality of pieces of resource pool information. In the first configuration information, if the service priority information and the plurality of pieces of resource pool information are at a same level, in other words, if the service priority information is not included in the resource pool information, there is a correspondence between the service priority information and the resource pools represented by the plurality of pieces of resource pool information. Therefore, the terminal device can determine the first resource pool corresponding to the service priority information. The plurality of resource pools represented by the plurality of pieces of resource pool information may belong to different carriers. For example, the first configuration information is {service priority information, resource pool information 1, resource pool information 2, resource pool information 3}, a resource pool represented by the resource pool information 1 belongs to a carrier 1, a resource pool represented by the resource pool information 2 belongs to a carrier 2, and a resource pool represented by the resource pool information 3 belongs to a carrier 3. It can be learned from this example that the service priority information and the resource pool information are at a same level. In this case, it can be understood that there is a correspondence between the current service priority information and the resource pool represented by the resource pool information 1, the resource pool represented by the resource pool information 2, and the resource pool represented by the resource pool information 3.

In an optional embodiment, the first configuration information further includes the service priority information. In addition, the terminal device may receive other configuration information sent by the network device, and resource pool information of a resource pool corresponding to the service priority information may be included in the other configuration information. Then, after receiving the first configuration information and the other configuration information, the terminal device can determine the first resource pool corresponding to the service priority information.

In an optional embodiment, the first resource pool is a sending resource pool.

(2) Implementation 2 of step 201: The first configuration information includes the condition information, and the condition information includes that a channel congestion degree of a second resource pool and first channel congestion information meet a second specific relationship.

The first channel congestion information is a first channel congestion threshold or a first channel congestion range.

When the first channel congestion information is the first channel congestion threshold, the second specific relationship is that the channel congestion degree of the second resource pool is greater than the first channel congestion threshold, the channel congestion degree of the second resource pool is equal to the first channel congestion threshold, or the channel congestion degree of the second resource pool is greater than or equal to the first channel congestion threshold; or when the first channel congestion information is the first channel congestion range, the second specific relationship is that the channel congestion degree of the second resource pool is within the first channel congestion range.

In this case, after step 201, the terminal device determines that a first resource set includes the second resource pool, and the second resource pool is a resource pool corresponding to the first channel congestion information.

In this embodiment, the network device sends the first configuration information to the terminal device, the first configuration information includes the condition information, and the condition information is that the channel congestion degree of the second resource pool and the first channel congestion information meet the second specific relationship.

The first channel congestion information may be the first channel congestion threshold. In this case, the condition information is represented as follows: Only when the channel congestion degree of the second resource pool is greater than the first channel congestion threshold, the channel congestion degree of the second resource pool is equal to the first channel congestion threshold, or the channel congestion degree of the second resource pool is greater than or equal to the first channel congestion threshold, the terminal device is triggered to perform step 202. Alternatively, the first channel congestion information may be the first channel congestion range. In this case, the condition information is represented as follows: Only when the channel congestion degree of the second resource pool is within the first channel congestion range, the terminal device is triggered to perform step 202.

A channel congestion degree of a resource pool is used to describe a business degree of the resource pool. The channel congestion degree of the resource pool may be obtained by the terminal device through measurement, or may be notified by the network device to the terminal device. Optionally, the channel congestion degree of the resource pool may be a percentage of a resource block whose power exceeds a preset power threshold in all resource blocks in the resource pool or a percentage of a channel whose power exceeds a preset power threshold in all channels in the resource pool in a period of time. The preset power threshold may be configured by the network device for the terminal device, or may be preconfigured on the terminal. For example, in a period of time, a resource pool has five resource blocks, and powers of three resource blocks exceed the preset power threshold. In this case, a channel congestion degree of the resource pool is 60%.

Then, the terminal device may determine that the first resource set includes at least one second resource pool, and the second resource pool is a resource pool corresponding to the first channel congestion information.

Herein, a correspondence between first channel congestion information and a resource pool may be implicit or explicit. Specifically, when the correspondence between first channel congestion information and a resource pool is implicit, the correspondence is implicitly described by using at least one piece of configuration information; or when the correspondence between first channel congestion information and a resource pool is explicit, the correspondence is indicated by using a name of configuration information or a name of an element in the configuration information. The configuration information may be carried by using RRC signaling. Optionally, the RRC signaling may be a SIB. The configuration information herein is a generalized concept. For example, the first configuration information and other configuration information are all configuration information. The RRC signaling and/or the SIB herein are/is also a generalized concept. For example, both first RRC signaling and second RRC signaling in this application are RRC signaling.

In an optional embodiment, the first configuration information further includes at least one piece of resource pool information, and each piece of resource pool information is used to represent one resource pool. If one piece of resource pool information includes one piece of first channel congestion information, there is a correspondence between the first channel congestion information and a resource pool represented by the resource pool information. Therefore, the terminal device can determine the second resource pool corresponding to the first channel congestion information.

In an optional embodiment, the first configuration information includes at least one piece of carrier information, one piece of carrier information corresponds to one carrier, and each piece of carrier information points to at least one resource pool that belongs to a carrier corresponding to the carrier information. In addition, if one piece of carrier information includes one piece of first channel congestion information, there is a correspondence between the first channel congestion information and a resource pool indicated by the carrier information. Therefore, the terminal device can determine the second resource pool corresponding to the first channel congestion information.

In an optional embodiment, the first configuration information further includes the first channel congestion information and a plurality of pieces of resource pool information, each piece of resource pool information is used to represent one resource pool, and the first configuration information indicates a plurality of resource pools that can be represented by using the plurality of pieces of resource pool information. In the first configuration information, if the first channel congestion information and the plurality of pieces of resource pool information are at a same level, in other words, if the first channel congestion information is not included in the resource pool information, there is a correspondence between the first channel congestion information and the resource pools represented by the plurality of pieces of resource pool information. Therefore, the terminal device can determine the second resource pool corresponding to the first channel congestion information. The plurality of resource pools represented by the plurality of pieces of resource pool information may belong to different carriers.

In an optional embodiment, the first configuration information further includes the first channel congestion information. In addition, the terminal device may receive other configuration information sent by the network device, and resource pool information of a resource pool corresponding to the first channel congestion information may be included in the other configuration information. Then, after receiving the first configuration information and the other configuration information, the terminal device can determine the second resource pool corresponding to the first channel congestion information.

(3) Implementation 3 of step 201: The first configuration information includes the condition information, and the condition information includes that a channel congestion degree of K logical channels and branch channel congestion information meet a third specific relationship.

The branch channel congestion information is a branch channel congestion threshold or a branch channel congestion range.

When the branch channel congestion information is the branch channel congestion threshold, the third specific relationship is that the channel congestion degree of the K logical channels is greater than the branch channel congestion threshold, the channel congestion degree of the K logical channels is equal to the branch channel congestion threshold, or the channel congestion degree of the K logical channels is greater than or equal to the branch channel congestion threshold; or when the branch channel congestion information is the branch channel congestion range, the third specific relationship is that the channel congestion degree of the K logical channels is within the branch channel congestion range.

The channel congestion degree of the K logical channels includes any one of the following: a minimum value in channel congestion degrees of all resource pools used on the K logical channels, a maximum value in the channel congestion degrees of all the resource pools used on the K logical channels, and an average value of the channel congestion degrees of all the resource pools used on the K logical channels.

In this case, after step 201, the terminal device determines that a first resource set includes a third resource pool, and the third resource pool is a resource pool corresponding to the branch channel congestion information.

In this embodiment, the network device sends the first configuration information to the terminal device, the first configuration information includes the condition information, and the condition information is that the channel congestion degree of the K logical channels and the branch channel congestion information meet the third specific relationship.

The branch channel congestion information may be the branch channel congestion threshold. In this case, the condition information is represented as follows: Only when the channel congestion degree of the K logical channels currently used by the terminal is greater than the branch channel congestion threshold, the channel congestion degree of the K logical channels currently used by the terminal is equal to the branch channel congestion threshold, or the channel congestion degree of the K logical channels currently used by the terminal is greater than or equal to the branch channel congestion threshold, the terminal device is triggered to add N-K logical channels, and then the terminal device performs step 202. Alternatively, the branch channel congestion information may be the branch channel congestion range. In this case, the condition information is represented as follows: Only when the channel congestion degree of the K logical channels currently used by the terminal is within the branch channel congestion range, the terminal device is triggered to add N-K logical channels, and then the terminal device performs step 202. Herein, K is a positive integer less than N.

Herein, the channel congestion degree of the K logical channels is the minimum value in the channel congestion degrees of all the resource pools used on the K logical channels currently used by the terminal, the maximum value in the channel congestion degrees of all the resource pools used on the K logical channels currently used by the terminal, or the average value of the channel congestion degrees of all the resource pools used on the K logical channels currently used by the terminal.

In addition, a channel congestion degree of a resource pool is used to describe a business degree of the resource pool. The channel congestion degree of the resource pool may be obtained by the terminal device through measurement, or may be notified by the network device to the terminal device. Optionally, the channel congestion degree of the resource pool may be a percentage of a resource block whose power exceeds a preset power threshold in all resource blocks in the resource pool or a percentage of a channel whose power exceeds a preset power threshold in all channels in the resource pool in a period of time. The preset power threshold may be configured by the network device for the terminal device, or may be preconfigured on the terminal. For example, in a period of time, a resource pool has five resource blocks, and powers of three resource blocks exceed the preset power threshold. In this case, a channel congestion degree of the resource pool is 60%.

Then, the terminal device may determine that the first resource set includes at least one third resource pool, and each third resource pool is a resource pool corresponding to the branch channel congestion information.

Herein, a correspondence between branch channel congestion information and a resource pool may be implicit or explicit. Specifically, when the correspondence between branch channel congestion information and a resource pool is implicit, the correspondence is implicitly described by using at least one piece of configuration information; or when the correspondence between branch channel congestion information and a resource pool is explicit, the correspondence is indicated by using a name of configuration information or a name of an element in the configuration information. The configuration information may be carried by using RRC signaling or a SIB. The configuration information herein is a generalized concept. For example, the first configuration information and other configuration information are all configuration information. The RRC signaling and/or the SIB herein are/is also a generalized concept. For example, both first RRC signaling and second RRC signaling in this application are RRC signaling.

In an optional embodiment, the first configuration information further includes at least one piece of resource pool information, and each piece of resource pool information is used to represent one resource pool. If one piece of resource pool information includes one piece of branch channel congestion information, there is a correspondence between the branch channel congestion information and a resource pool represented by the resource pool information. Therefore, the terminal device can determine the third resource pool corresponding to the branch channel congestion information.

In an optional embodiment, the first configuration information further includes at least one piece of carrier information, one piece of carrier information corresponds to one carrier, and each piece of carrier information points to at least one resource pool that belongs to a carrier corresponding to the carrier information. In addition, if one piece of carrier information includes one piece of branch channel congestion information, there is a correspondence between the branch channel congestion information and a resource pool indicated by the carrier information. Therefore, the terminal device can determine the third resource pool corresponding to the branch channel congestion information.

In an optional embodiment, the first configuration information further includes the branch channel congestion information and a plurality of pieces of resource pool information, each piece of resource pool information is used to represent one resource pool, and the first configuration information indicates a plurality of resource pools that can be represented by using the plurality of pieces of resource pool information. In the first configuration information, if the branch channel congestion information and the plurality of pieces of resource pool information are at a same level, in other words, if the branch channel congestion information is not included in the resource pool information, there is a correspondence between the branch channel congestion information and the resource pools represented by the plurality of pieces of resource pool information. Therefore, the terminal device can determine the third resource pool corresponding to the branch channel congestion information. The plurality of resource pools represented by the plurality of pieces of resource pool information may belong to different carriers.

In an optional embodiment, the first configuration information further includes the branch channel congestion information. In addition, the terminal device may receive other configuration information sent by the network device, and resource pool information of a resource pool corresponding to the branch channel congestion information may be included in the other configuration information. Then, after receiving the first configuration information and the other configuration information, the terminal device can determine the third resource pool corresponding to the branch channel congestion information.

(4) Implementation 4 of step 201: The first configuration information includes the condition information, and the condition information includes first indication information.

In addition, the first indication information points to a resource pool that can be used when the terminal device repeatedly transmits the data.

In this case, after step 201, the terminal device determines that a first resource set includes a fourth resource pool, and the fourth resource pool is a resource pool corresponding to the first indication information.

In this embodiment, the network device sends the first configuration information to the terminal device, the first configuration information includes the condition information, and the condition information is the first indication information. The first indication information indicates the resource pool that can be used when the terminal device performs step 203. Then, the terminal device performs step 202 only after the terminal device determines that the first indication information is received.

In addition, after the terminal device receives the first indication information, the terminal device may determine that the first resource set includes at least one fourth resource pool. The at least one fourth resource pool is a resource pool indicated by the first indication information.

Herein, a pointing relationship between first indication information and a resource pool may be implicit or explicit. Specifically, when the pointing relationship between first indication information and a resource pool is implicit, the pointing relationship is implicitly described by using at least one piece of configuration information; or when the pointing relationship between first indication information and a resource pool is explicit, the pointing relationship is indicated by using a name of configuration information or a name of an element in the configuration information. The configuration information may be carried by using RRC signaling. Optionally, the RRC signaling may be a SIB. The configuration information herein is a generalized concept. For example, the first configuration information and other configuration information below are all configuration information. The RRC signaling and/or the SIB herein are/is also a generalized concept. For example, both first RRC signaling and second RRC signaling in this application are RRC signaling.

In an optional embodiment, the first configuration information further includes at least one piece of resource pool information, and each piece of resource pool information is used to represent one resource pool. If one piece of resource pool information includes one piece of first indication information, there is a correspondence between the first indication information and a resource pool represented by the resource pool information. Therefore, the terminal device can determine the fourth resource pool corresponding to the first indication information.

In an optional embodiment, the first configuration information further includes at least one piece of carrier information, one piece of carrier information corresponds to one carrier, and each piece of carrier information points to at least one resource pool that belongs to a carrier corresponding to the carrier information. In addition, if one piece of carrier information includes one piece of first indication information, there is a correspondence between the first indication information and a resource pool indicated by the carrier information. Therefore, the terminal device can determine the fourth resource pool corresponding to the first indication information.

In an optional embodiment, the first configuration information further includes the first indication information and a plurality of pieces of resource pool information, each piece of resource pool information is used to represent one resource pool, and the first configuration information indicates a plurality of resource pools that can be represented by using the plurality of pieces of resource pool information. In the first configuration information, if the first indication information and the plurality of pieces of resource pool information are at a same level, in other words, if the first indication information is not included in the resource pool information, there is a correspondence between the first indication information and the resource pools represented by the plurality of pieces of resource pool information. Therefore, the terminal device can determine the fourth resource pool corresponding to the first indication information. The plurality of resource pools represented by the plurality of pieces of resource pool information may belong to different carriers.

In an optional embodiment, the first configuration information further includes the first indication information. In addition, the terminal device may receive other configuration information sent by the network device, and resource pool information of a resource pool corresponding to the first indication information may be included in the other configuration information. Then, after receiving the first configuration information and the other configuration information, the terminal device can determine the fourth resource pool corresponding to the first indication information.

(5) Implementation 5 of step 201: The first configuration information includes the condition information, the condition information includes at least one carrier sequence, and each carrier sequence includes at least one carrier.

In addition, each carrier sequence points to a resource pool that can be used when the terminal device repeatedly transmits the data.

In this case, after step 201, the terminal device determines that a first resource set includes a fifth resource pool, and the fifth resource pool is a resource pool corresponding to each carrier sequence.

In this embodiment, the network device sends the first configuration information to the terminal device, the first configuration information includes the condition information, the condition information includes the at least one carrier sequence, and each carrier sequence includes the at least one carrier. For example, the condition information includes a carrier sequence A and a carrier sequence B, the carrier sequence A includes a carrier 1 and a carrier 2, and the carrier sequence B includes a carrier 3 and a carrier 4.

Each carrier corresponds to at least one resource pool. Optionally, there is a correspondence between a resource pool and a single carrier. For example, the carrier sequence A includes the carrier 1 and the carrier 2, a resource pool 1 corresponds to the carrier 1, a resource pool 2 corresponds to the carrier 1, and a resource pool 3 corresponds to the carrier 2.

In addition, each carrier sequence indicates a resource pool that can be used when the terminal device performs step 203. Then, the terminal device performs step 202 only after the terminal device determines that the at least one carrier sequence is received.

In addition, after the terminal device receives the at least one carrier sequence, the terminal device may determine that the first resource set includes at least one fifth resource pool. The fifth resource pool is a resource pool corresponding to a carrier in the carrier sequence.

Herein, a pointing relationship between a carrier sequence and a resource pool may be implicit or explicit. Specifically, when the pointing relationship between a carrier sequence and a resource pool is implicit, the pointing relationship is implicitly described by using at least one piece of configuration information; or when the pointing relationship between a carrier sequence and a resource pool is explicit, the pointing relationship is indicated by using a name of configuration information or a name of an element in the configuration information. The configuration information may be carried by using RRC signaling. Optionally, the RRC signaling may be a SIB. The configuration information herein is a generalized concept. For example, the first configuration information and other configuration information below are all configuration information. The RRC signaling and/or the SIB herein are/is also a generalized concept. For example, both first RRC signaling and second RRC signaling in this application are RRC signaling.

In an optional embodiment, the condition information includes the at least one carrier sequence, one carrier sequence includes at least one carrier, and each carrier points to at least one resource pool corresponding to the carrier. In this case, there is a correspondence between the carrier sequence and the resource pool corresponding to each carrier included in the carrier sequence. Therefore, the terminal device can determine the fifth resource pool corresponding to the carrier sequence.

Optionally, the carrier included in the carrier sequence may be indicated by using a carrier identifier.

Optionally, a correspondence between a carrier and a resource pool may be that the resource pool belongs to the carrier.

In an optional embodiment, the condition information includes the at least one carrier sequence. In addition, the terminal device may receive other configuration information sent by the network device, and resource pool information of a resource pool corresponding to the carrier sequence may be included in the other configuration information. Then, after receiving the first configuration information and the other configuration information, the terminal device can determine the fifth resource pool corresponding to each carrier sequence.

(6) Implementation 6 of step 201: The first configuration information includes the condition information, and the condition information includes second indication information.

In an optional embodiment, the second indication information may be a bearer identifier that corresponds to the data at the PDCP layer and that is included in a media access control control element (MAC CE). When the terminal device receives the bearer identifier included in the MAC CE, it indicates that the terminal device is allowed to separately send the data in the PDCP entity to the N logical channels.

Optionally, the bearer identifier may be represented in a form of a bitmap.

In this embodiment, the network device sends the first configuration information to the terminal device, the first configuration information includes the second indication information, and the second indication information indicates that the terminal device can perform step 202.

(7) Implementation 7 of step 201: The condition information includes any combination of at least one of the following information: information indicating that a service priority and service priority information meet a first specific relationship, information indicating that a channel congestion degree of a second resource pool and first channel congestion information meet a second specific relationship, information indicating that a channel congestion degree of K logical channels and branch channel congestion information meet a third specific relationship, first indication information, and at least one carrier sequence.

In this case, after step 201, the terminal device determines that a first resource set includes a sixth resource pool, and the sixth resource pool is a resource pool meeting a requirement of the foregoing combination.

In this embodiment, the network device sends the first configuration information to the terminal device, the first configuration information includes the condition information, and the condition information may include any combination of at least one of the following information: the information indicating that the service priority and the service priority information meet the first specific relationship, the information indicating that the channel congestion degree of the second resource pool and the first channel congestion information meet the second specific relationship, the information indicating that the channel congestion degree of the K logical channels and the branch channel congestion information meet the third specific relationship, the first indication information, and the at least one carrier sequence. For a case in which the condition information includes that the service priority and the service priority information meet the first specific relationship, refer to the description in the implementation 1 of step 201. For a case in which the condition information includes that the channel congestion degree of the second resource pool and the first channel congestion information meet the second specific relationship, refer to the description in the implementation 2 of step 201. For a case in which the condition information includes that the channel congestion degree of the K logical channels and the branch channel congestion information meet the third specific relationship, refer to the description in the implementation 3 of step 201. For a case in which the condition information includes the first indication information, refer to the description in the implementation 4 of step 201. For a case in which the condition information includes the at least one carrier sequence, refer to the description in the implementation 5 of step 201.

Then, the terminal device may determine that the first resource set includes at least one sixth resource pool, and the sixth resource pool is a resource pool meeting the requirement of the information combination in the condition information.

For example, the network device sends the first configuration information to the terminal device, the first configuration information includes the condition information, and the condition information includes that the service priority and the service priority information meet the first specific relationship and the channel congestion degree of the second resource pool and the first channel congestion information meet the second specific relationship. In this case, the terminal device performs step 202 only when the terminal device determines that the service priority and the service priority information meet the first specific relationship and the channel congestion degree of the second resource pool and a first channel congestion threshold meet the second specific relationship. Then, the terminal device determines that the first resource set includes the at least one sixth resource pool, and the sixth resource pool is a resource pool corresponding to both the service priority information and the first channel congestion information.

For another example, the network device sends the first configuration information to the terminal device, the first configuration information includes the condition information, and the condition information includes that the service priority and the service priority information meet the first specific relationship and the channel congestion degree of the K logical channels and the branch channel congestion information meet the third specific relationship. In this case, the terminal device performs step 202 only when the terminal device determines that the service priority and the service priority information meet the first specific relationship and the channel congestion degree of the K logical channels currently used by the terminal device and the branch channel congestion information meet the third specific relationship. Then, the terminal device determines that the first resource set includes the at least one sixth resource pool, and the sixth resource pool is a resource pool corresponding to both the service priority information and the branch channel congestion information.

For still another example, the network device sends the first configuration information to the terminal device, the first configuration information includes the condition information, and the condition information includes that the service priority and the service priority information meet the first specific relationship and the channel congestion degree of the second resource pool and the first channel congestion information meet the second specific relationship, and includes the at least one carrier sequence. In this case, the terminal device performs step 202 only when the terminal device determines that the service priority and the service priority information meet the first specific relationship and the channel congestion degree of the second resource pool and a first channel congestion threshold meet the second specific relationship, and determines that a resource pool indicated by the at least one carrier sequence is found. Then, the terminal device determines that the first resource set includes the at least one sixth resource pool, and the sixth resource pool is a resource pool corresponding to all of the service priority information, the first channel congestion information, and the carrier sequence.

In the foregoing several implementations, the resource pools included in the first resource set belongs to X carriers, and X is a positive integer less than or equal to N. Therefore, in all the resource pools included in the first resource set, a plurality of resource pools may correspond to one carrier, or one resource pool may correspond to one carrier.

Optionally, a correspondence between a resource pool and a carrier may be that one resource pool belongs to one carrier.

202. The terminal device separately sends the data in the PDCP entity to the N logical channels, where a direct link transmission manner is used on at least one of the N logical channels.

In an optional implementation, there is a correspondence between the PDCP entity and the N logical channels. The correspondence is obtained by the terminal device by using first RRC signaling, or the correspondence is determined by the terminal device.

In an optional implementation, step 202 specifically includes: separately sending, by the terminal device, the data in the PDCP entity to L RLC entities corresponding to the N logical channels, where each of the L RLC entities corresponds to at least one of the N logical channels, different RLC entities in the L RLC entities correspond to different logical channels, and L is a positive integer less than or equal to N.

In this step, for step 202, refer to step 101 in FIG. 3. Details are not described herein again.

203. The terminal device obtains a resource.

In an optional implementation, step 203 includes the following two implementations:

Implementation 1 of step 203: The terminal device receives resource configuration signaling sent by the network device, where the resource configuration signaling is used to indicate a resource dynamically scheduled or semi-dynamically scheduled by the network device for the terminal device; and obtains the resource.

Implementation 2 of step 203: The terminal device obtains the resource from the first resource set, where the first resource set includes at least one resource pool.

In this step, the terminal device may obtain the resource in the following two manners.

In a first manner, the network device may send the resource configuration signaling to the terminal device, and the resource configuration signaling indicates the resource dynamically scheduled or semi-dynamically scheduled by the network device for the terminal device. Then, the terminal device may obtain, based on the resource configuration signaling, the resource dynamically scheduled or semi-dynamically scheduled by the network device for the terminal device. In this case, a condition included in the first configuration information in step 201 may be any implementation of step 201, and mainly includes (6) the implementation 6 of step 201. In other words, the first configuration information includes the second indication information.

In a second manner, the terminal device obtains the resource from the first resource set including a plurality of resource pools. In this case, the condition information included in the first configuration information in step 201 may be (1) the implementation 1 of step 201, (2) the implementation 2 of step 201, (3) the implementation 3 of step 201, (4) the implementation 4 of step 201, (5) the implementation 5 of step 201, or (7) the implementation 7 of step 201. In other words, the first resource set is a resource set determined in any one of the foregoing several implementations.

204. The terminal device sends the data on the N logical channels by using the obtained resource.

In an optional implementation, step 204 specifically includes: sending, by the terminal device by using the obtained resource, the data in the L RLC entities corresponding to the N logical channels.

In this step, for step 204, refer to step 103 in FIG. 3. Details are not described herein again.

Figure 8:
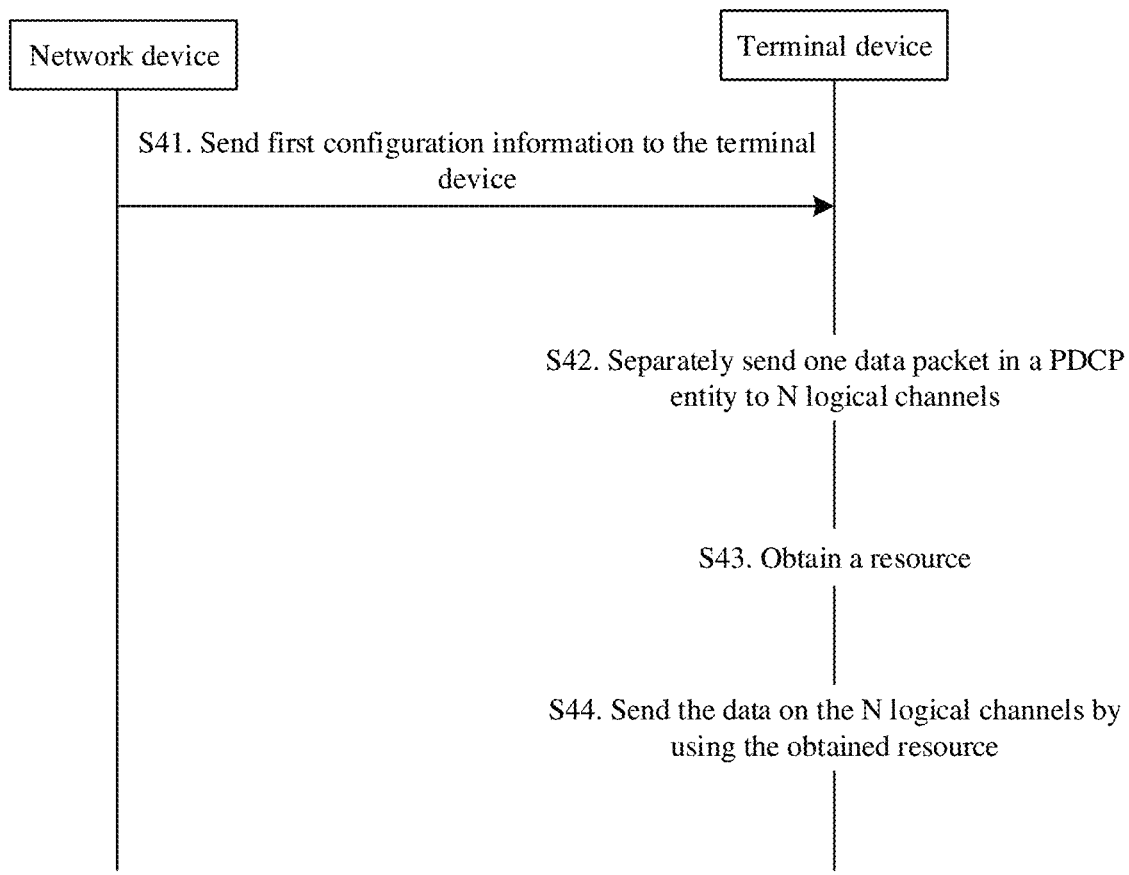
FIG. 8 is a signaling diagram of another method for repeatedly transmitting data according to an embodiment of this application.

FIG. 8 is a signaling diagram of another method for repeatedly transmitting data according to an embodiment of this application, and is used to implement the steps in FIG. 7. As shown in FIG. 8, the method includes the following steps.

S41. A network device sends first configuration information to a terminal device, where the first configuration information includes condition information, the condition information is used to trigger the terminal device to separately send one piece of data in a PDCP entity to N logical channels, and N is a positive integer greater than or equal to 2.

The first configuration information may be the same as or different from first RRC signaling.

For this step, refer to step 201 in FIG. 7. Details are not described herein again.

S42. The terminal device separately sends the data in the PDCP entity to the N logical channels, where a direct link transmission manner is used on at least one of the N logical channels.

For this step, refer to step 202 in FIG. 7. Details are not described herein again.

S43. The terminal device obtains a resource.

For this step, refer to step 203 in FIG. 7. Details are not described herein again.

S44. The terminal device sends the data on the N logical channels by using the obtained resource.

For this step, refer to step 204 in FIG. 7. Details are not described herein again.

In an optional implementation, before step S42, the method may further include step S45:

S45. The terminal device determines a correspondence between the PDCP entity and the N logical channels, where the PDCP entity and the N logical channels correspond to L RLC entities.

In this embodiment, the terminal device receives the first configuration information sent by the network device, where the first configuration information includes the condition information, the condition information is used to trigger the terminal device to separately send the data in the PDCP entity to the N logical channels, and N is a positive integer greater than or equal to 2; the terminal device separately sends the data in the PDCP entity to the N logical channels, where the direct link transmission manner is used on the at least one of the N logical channels; the terminal device obtains the resource; and the terminal device sends the data on the N logical channels by using the obtained resource. There is the correspondence between the L RLC entities and the N logical channels. Therefore, when terminal devices communicate with each other in a direct link manner, if the terminal device separately sends the data in the PDCP entity to the L RLC entities corresponding to the N logical channels, the data in the PDCP entity is sent to the N logical channels, so that the terminal device can send the data on the N logical channels by using the obtained resource. In this way, the terminal device can send same data on a plurality of logical channels on a direct link, so that reliability of data transmission performed in the direct link transmission manner can be ensured. In addition, the terminal device obtains, from the network device, a condition of repeatedly transmitting the data, and then repeatedly transmits the data based on the condition of repeatedly transmitting the data.

Figure 9:
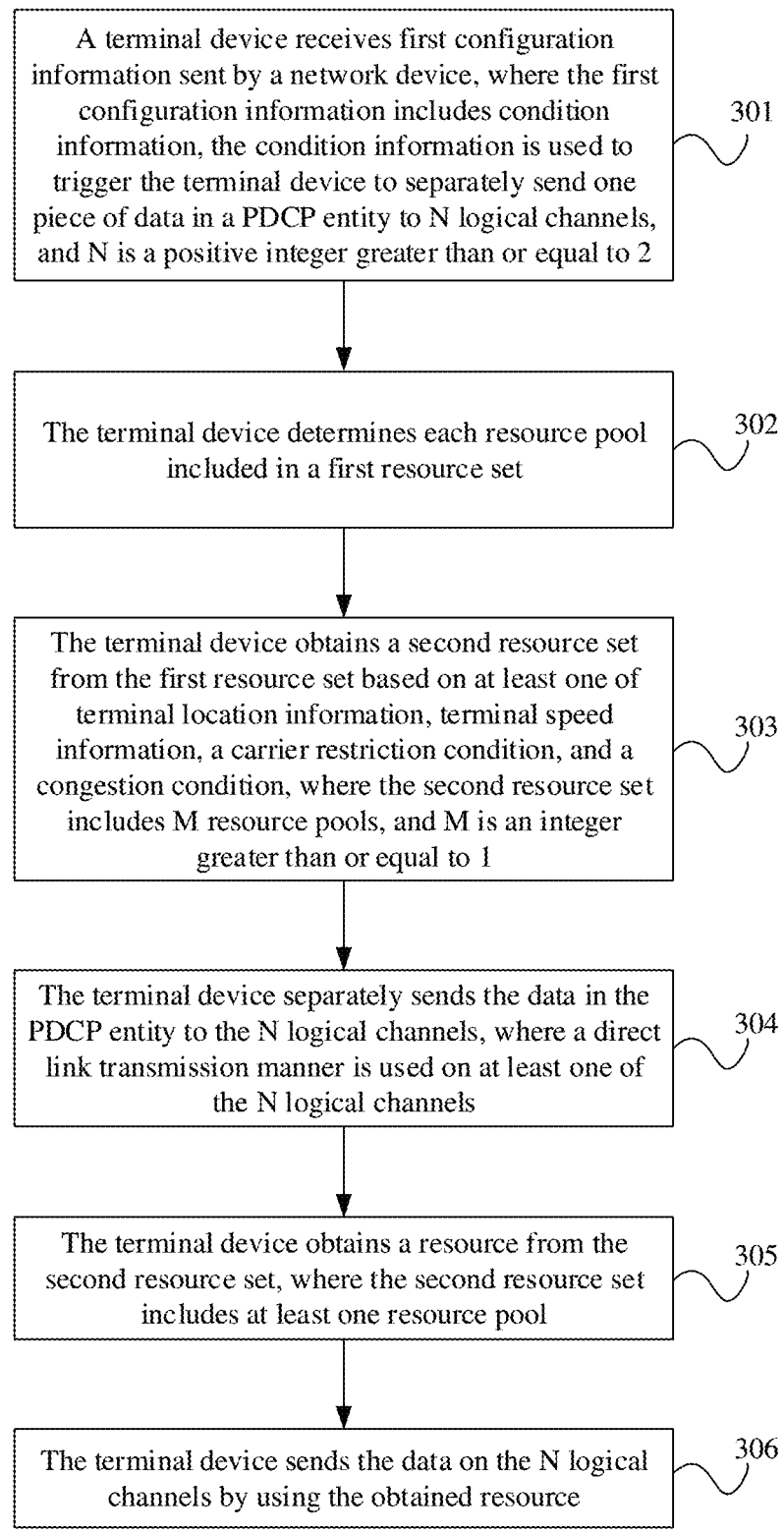
FIG. 9 is a schematic flowchart of still another method for repeatedly transmitting data according to an embodiment of this application.

FIG. 9 is a schematic flowchart of still another method for repeatedly transmitting data according to an embodiment of this application. As shown in FIG. 9, the method includes the following steps.

301. A terminal device receives first configuration information sent by a network device, where the first configuration information includes condition information, the condition information is used to trigger the terminal device to separately send one piece of data in a PDCP entity to N logical channels, and N is a positive integer greater than or equal to 2.

302. The terminal device determines each resource pool included in a first resource set.

In this embodiment, for step 301 and step 302, refer to the implementation 1 of step 201, the implementation 2 of step 201, the implementation 3 of step 201, the implementation 4 of step 201, the implementation 5 of step 201, or the implementation 7 of step 201 in FIG. 7. Then, the first resource set is determined.

303. The terminal device obtains a second resource set from the first resource set based on at least one of terminal location information, terminal speed information, a carrier restriction condition, and a congestion condition, where the second resource set includes M resource pools, and M is an integer greater than or equal to 1.

The terminal location information is used to indicate that the M resource pools meet a location information requirement of the terminal device.

The terminal speed information is used to indicate that the M resource pools meet a speed information requirement of the terminal device.

The carrier restriction condition is used to indicate that the M resource pools respectively belong to different carriers.

The congestion condition includes that a channel congestion degree of the M resource pools and second channel congestion information meet a fourth specific relationship, the second channel congestion information is a second channel congestion threshold or a second channel congestion range, and when the second channel congestion information is the second channel congestion threshold, the fourth specific relationship is that the channel congestion degree of the M resource pools is greater than the second channel congestion threshold, the channel congestion degree of the M resource pools is equal to the second channel congestion threshold, or the channel congestion degree of the M resource pools is greater than or equal to the second channel congestion threshold; or when the second channel congestion information is the second channel congestion range, the fourth specific relationship is that the channel congestion degree of the M resource pools is within the second channel congestion range.

The channel congestion degree of the M resource pools is any one of the following: a minimum value in channel congestion degrees of all of the M resource pools, a maximum value in the channel congestion degrees of all of the M resource pools, and an average value of the channel congestion degrees of all of the M resource pools.

In this embodiment, the terminal device selects the M resource pools from the first resource set, the M resource pools form the second resource set, and M is an integer greater than or equal to 1.

Specifically, the terminal device selects the M resource pools from the first resource set based on at least one of the following information: the terminal location information, the terminal speed information, the carrier restriction condition, and the congestion condition.

The terminal location information indicates that the M selected resource pools need to meet the location information requirement of the terminal device. In an optional embodiment, each resource pool has a specific constraint on the location information of the terminal device. For example, only a terminal device in a specific location area can use a current resource pool, and the terminal device needs to select, for use, a resource pool that meets a location information constraint.

The terminal speed information indicates that the M selected resource pools need to meet the speed information requirement of the terminal device. In an optional embodiment, each resource pool has a specific constraint on the terminal speed information. For example, only when the speed information of the terminal device is greater than a speed threshold, the terminal device can use a current resource pool, and the terminal device needs to select, for use, a resource pool that meets a location information constraint on the terminal device. The speed information requirement herein may alternatively be a range or another constraint. This is not limited in this application.

The carrier restriction condition indicates that the M selected resource pools need to respectively belong to the different carriers.

The congestion condition indicates that the channel congestion degree of the M selected resource pools and the second channel congestion information need to meet the fourth specific relationship. When the second channel congestion information is the second channel congestion threshold, the channel congestion degree of the M selected resource pools needs to be greater than the second channel congestion threshold, the channel congestion degree of the M selected resource pools needs to be equal to the second channel congestion threshold, or the channel congestion degree of the M selected resource pools may be greater than or equal to the second channel congestion threshold. When the second channel congestion information is the second channel congestion range, the channel congestion degree of the M selected resource pools needs to be within the second channel congestion range. In addition, the channel congestion degree of the M selected resource pools refers to the minimum value in the channel congestion degrees of all of the M selected resource pools, the maximum value in the channel congestion degrees of all of the M selected resource pools, or the average value of the channel congestion degrees of all of the M selected resource pools.

In an optional implementation, a value of M may be selected to be equal to a value of N. For example, when the quantity N of logical channels is 10, a quantity of resource pools in the second resource set is 10.

In addition, a channel congestion degree of a resource pool is used to describe a business degree of the resource pool. The channel congestion degree of the resource pool may be obtained by the terminal device through measurement, or may be notified by the network device to the terminal device. Optionally, the channel congestion degree of the resource pool may be a percentage of a resource block whose power exceeds a preset power threshold in all resource blocks in the resource pool or a percentage of a channel whose power exceeds a preset power threshold in all channels in the resource pool in a period of time. The preset power threshold may be configured by the network device for the terminal device, or may be preconfigured on the terminal. For example, in a period of time, a resource pool has five resource blocks, and powers of three resource blocks exceed the preset power threshold. In this case, a channel congestion degree of the resource pool is 60%.

304. The terminal device separately sends the data in the PDCP entity to the N logical channels, where a direct link transmission manner is used on at least one of the N logical channels.

In an optional implementation, there is a correspondence between the PDCP entity and the N logical channels. The correspondence is obtained by the terminal device by using first RRC signaling, or the correspondence is determined by the terminal device.

In an optional implementation, step 304 specifically includes: separately sending, by the terminal device, the data in the PDCP entity to L RLC entities corresponding to the N logical channels, where each of the L RLC entities corresponds to at least one of the N logical channels, different RLC entities in the L RLC entities correspond to different logical channels, and L is a positive integer less than or equal to N.

In this step, for step 304, refer to step 202 in FIG. 7. Details are not described herein again.

305. The terminal device obtains a resource from the second resource set, where the second resource set includes at least one resource pool.

In this step, the terminal device selects the resource from all resource pools in the second resource set determined in step 303.

306. The terminal device sends the data on the N logical channels by using the obtained resource.

In an optional implementation, step 306 specifically includes: sending, by the terminal device by using the obtained resource, the data in the L RLC entities corresponding to the N logical channels.

In this step, for step 306, refer to step 204 in FIG. 7. Details are not described herein again.

Figure 10:
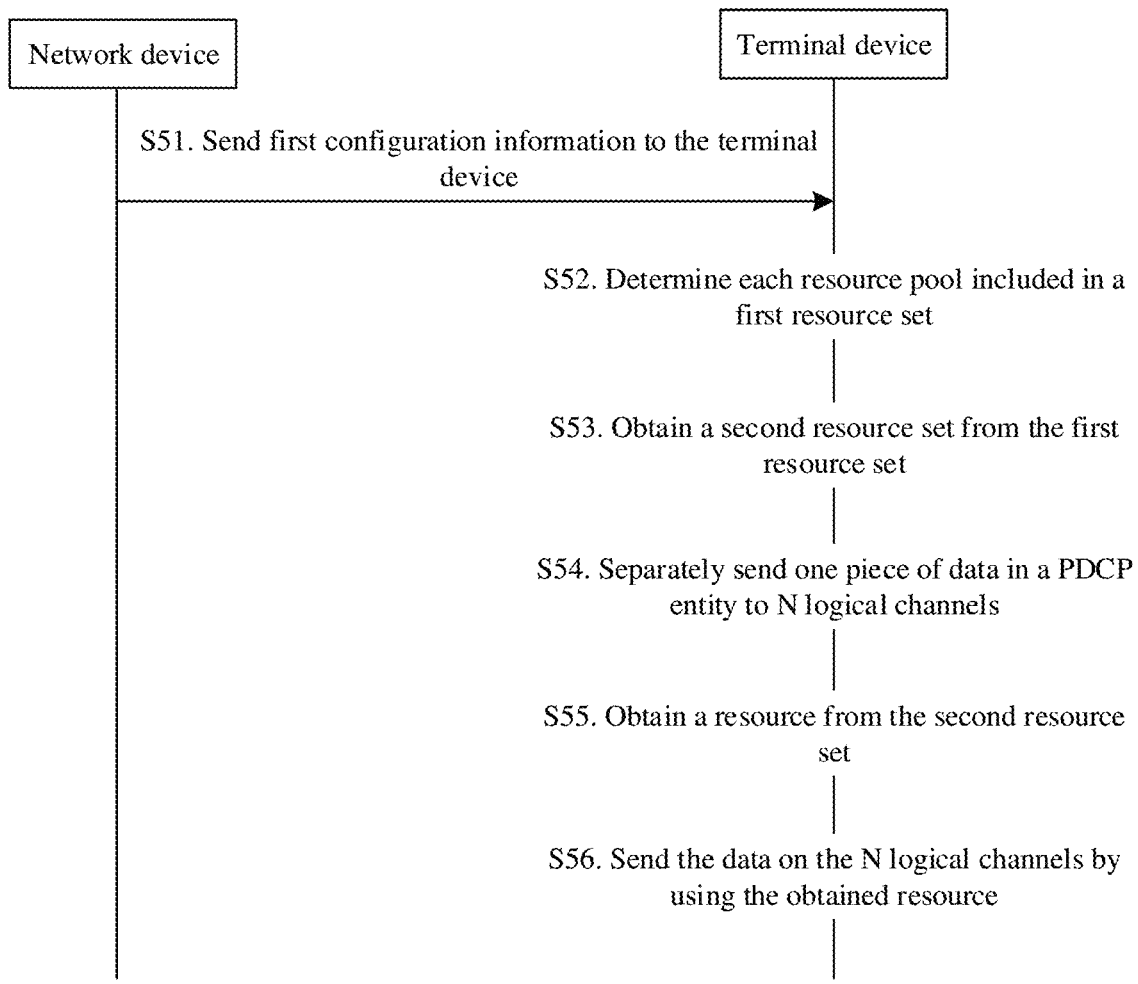
FIG. 10 is a signaling diagram of still another method for repeatedly transmitting data according to an embodiment of this application.

FIG. 10 is a signaling diagram of still another method for repeatedly transmitting data according to an embodiment of this application, and is used to implement the steps in FIG. 9. As shown in FIG. 10, the method includes the following steps.

S51. A network device sends first configuration information to a terminal device, where the first configuration information includes condition information, the condition information is used to trigger the terminal device to separately send one piece of data in a PDCP entity to N logical channels, and N is a positive integer greater than or equal to 2.

For this step, refer to step 301 in FIG. 9. Details are not described herein again.

S52. The terminal device determines each resource pool included in a first resource set.

For this step, refer to step 302 in FIG. 9. Details are not described herein again.

S53. The terminal device obtains a second resource set from the first resource set based on at least one of terminal location information, terminal speed information, a carrier restriction condition, and a congestion condition, where the second resource set includes M resource pools, and M is an integer greater than or equal to 1.

For this step, refer to step 303 in FIG. 9. Details are not described herein again.

S54. The terminal device separately sends the data in the PDCP entity to the N logical channels, where a direct link transmission manner is used on at least one of the N logical channels.

For this step, refer to step 304 in FIG. 9. Details are not described herein again.

S55. The terminal device obtains a resource from the second resource set.

For this step, refer to step 305 in FIG. 9. Details are not described herein again.

S56. The terminal device sends the data on the N logical channels by using the obtained resource.

For this step, refer to step 306 in FIG. 9. Details are not described herein again.

In an optional implementation, before step S54, the method may further include step S57:

S57. The terminal device determines a correspondence between the PDCP entity and the N logical channels.

In this embodiment, the terminal device receives the first configuration information sent by the network device, where the first configuration information includes the condition information, the condition information is used to trigger the terminal device to separately send the data in the PDCP entity to the N logical channels, and N is a positive integer greater than or equal to 2; the terminal device determines each resource pool included in the first resource set; the terminal device obtains the second resource set from the first resource set based on at least one of the terminal location information, the terminal speed information, the carrier restriction condition, and the congestion condition; the terminal device separately sends the data in the PDCP entity to the N logical channels, where the direct link transmission manner is used on the at least one of the N logical channels; the terminal device obtains the resource from the second resource set; and the terminal device sends the data on the N logical channels by using the obtained resource. There is the correspondence between the L RLC entities and the N logical channels. Therefore, when terminal devices communicate with each other in a direct link manner, if the terminal device separately sends the data in the PDCP entity to the L RLC entities corresponding to the N logical channels, the data in the PDCP entity is sent to the N logical channels, so that the terminal device can send the data on the N logical channels by using the obtained resource. In this way, the terminal device can send same data on a plurality of logical channels on a direct link, so that reliability of data transmission performed in the direct link transmission manner can be ensured. In addition, the terminal device obtains, from the network device, a condition of repeatedly transmitting the data, and then repeatedly transmits the data based on the condition of repeatedly transmitting the data.

Figure 11:
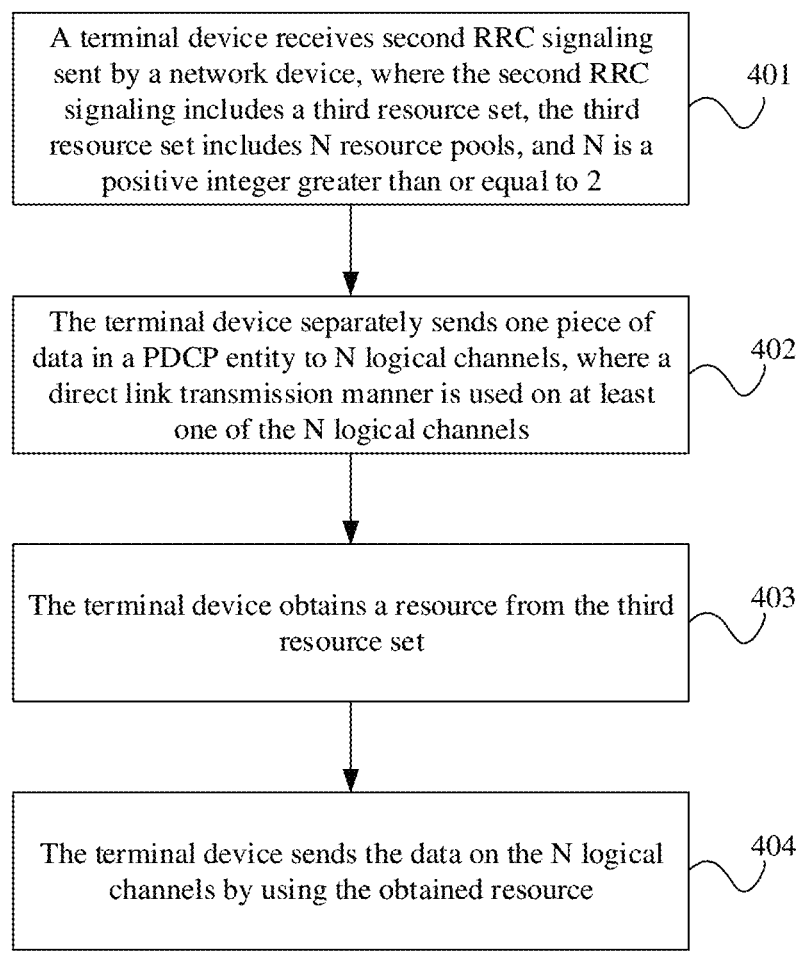
FIG. 11 is a schematic flowchart of yet another method for repeatedly transmitting data according to an embodiment of this application.

FIG. 11 is a schematic flowchart of yet another method for repeatedly transmitting data according to an embodiment of this application. As shown in FIG. 11, the method includes the following steps.

401. A terminal device receives second RRC signaling sent by a network device, where the second RRC signaling includes a third resource set, the third resource set includes N resource pools, and N is a positive integer greater than or equal to 2.

Optionally, the second RRC signaling may be the same as or different from first RRC signaling.

In this step, the network device invokes the N resource pools, and the network device adds information about the N invoked resource pools to the second RRC signaling, to add the third resource set to the second RRC signaling. The network device sends the second RRC signaling to the terminal device. For example, when a quantity N of logical channels is 9, a quantity of resource pools in the third resource set is 9.

In an optional implementation, the terminal device receives a plurality of pieces of second RRC signaling sent by the network device, and each piece of second RRC signaling includes at least one resource pool. Then, the terminal device obtains, by using the plurality of pieces of second RRC signaling, the third resource set including the N resource pools. For example, the terminal device receives N pieces of second RRC signaling sent by the network device, and each piece of second RRC signaling includes one resource pool. Then, the terminal device obtains, by using the N pieces of second RRC signaling, the third resource set including the N resource pools.

In an optional implementation, the terminal device receives one piece of second RRC signaling sent by the network device, and the second RRC signaling includes the N resource pools. Then, the terminal device obtains, by using the second RRC signaling, the third resource set including the N resource pools.

Optionally, the N resource pools belong to different carriers.

402. The terminal device separately sends one piece of data in a PDCP entity to N logical channels, where a direct link transmission manner is used on at least one of the N logical channels.

In an optional implementation, there is a correspondence between the PDCP entity and the N logical channels. The correspondence is obtained by the terminal device by using first RRC signaling, or the correspondence is determined by the terminal device.

In an optional implementation, step 402 specifically includes: separately sending, by the terminal device, the data in the PDCP entity to L RLC entities corresponding to the N logical channels, where each of the L RLC entities corresponds to at least one of the N logical channels, different RLC entities in the L RLC entities correspond to different logical channels, and L is a positive integer less than or equal to N.

For this step, refer to step 202 in FIG. 7. Details are not described herein again.

403. The terminal device obtains a resource from the third resource set.

In this step, the terminal device selects the resource from all resource pools in the third resource set.

404. The terminal device sends the data on the N logical channels by using the obtained resource.

In an optional implementation, step 404 specifically includes: sending, by the terminal device by using the obtained resource, the data in the L RLC entities corresponding to the N logical channels.

For this step, refer to step 204 in FIG. 7. Details are not described herein again.

Figures 12, 13:
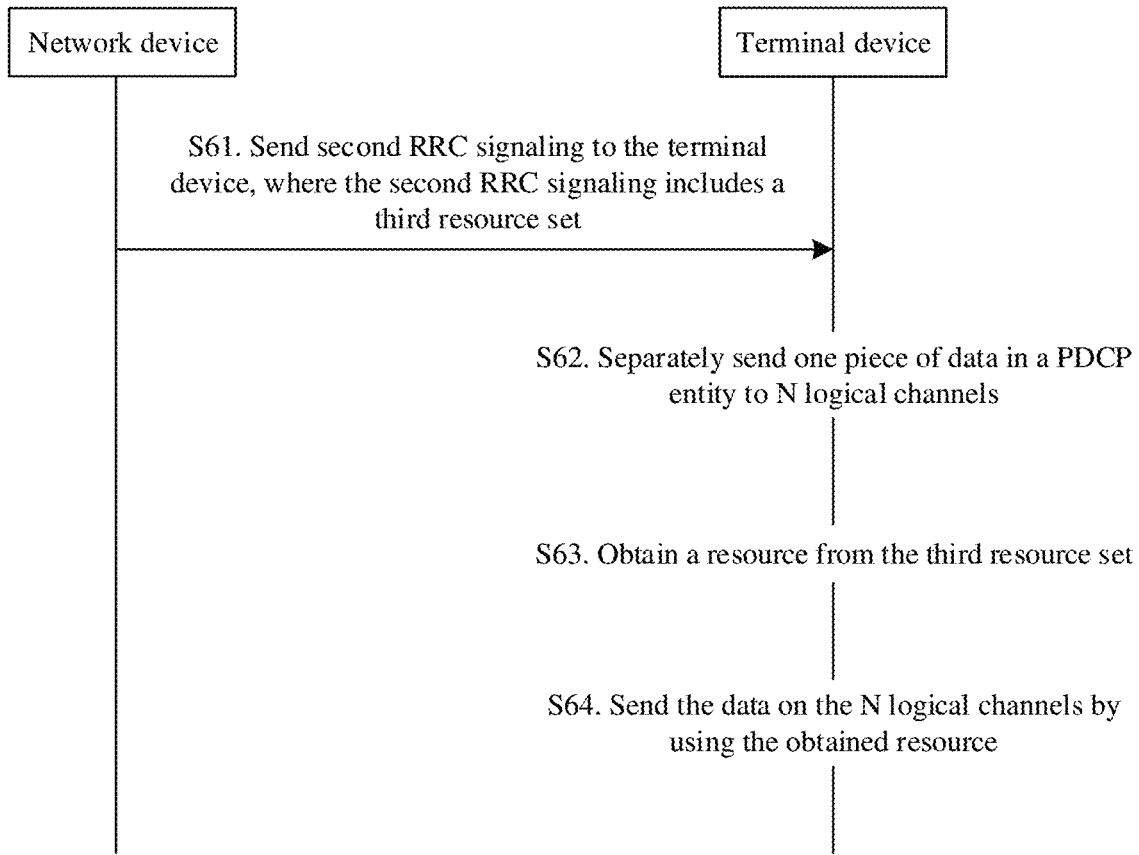
FIG. 12 is a signaling diagram of yet another method for repeatedly transmitting data according to an embodiment of this application.
FIG. 13 is a schematic flowchart of still yet another method for repeatedly transmitting data according to an embodiment of this application.

FIG. 12 is a signaling diagram of yet another method for repeatedly transmitting data according to an embodiment of this application, and is used to implement the steps in FIG. 11. As shown in FIG. 12, the method includes the following steps.

S61. A network device sends second RRC signaling to a terminal device, where the second RRC signaling includes a third resource set, the third resource set includes N resource pools, and N is a positive integer greater than or equal to 2.

For this step, refer to step 401 in FIG. 11. Details are not described herein again.

S62. The terminal device separately sends one piece of data in a PDCP entity to N logical channels, where a direct link transmission manner is used on at least one of the N logical channels.

For this step, refer to step 402 in FIG. 11. Details are not described herein again.

S63. The terminal device obtains a resource from the third resource set.

For this step, refer to step 403 in FIG. 11. Details are not described herein again.

S64. The terminal device sends the data on the N logical channels by using the obtained resource.

For this step, refer to step 404 in FIG. 11. Details are not described herein again.

In this embodiment, the terminal device receives the second RRC signaling sent by the network device, where the second RRC signaling includes the third resource set, and the third resource set includes the N resource pools; the terminal device separately sends the data in the PDCP entity to the N logical channels, where the direct link transmission manner is used on the at least one of the N logical channels, and N is a positive integer greater than or equal to 2; the terminal device obtains the resource from the third resource set; and the terminal device sends the data on the N logical channels by using the obtained resource. Therefore, when terminal devices communicate with each other in a direct link manner, the terminal device separately sends the data in the PDCP entity to the N logical channels, so that the terminal device can send the data on the N logical channels by using the obtained resource. In this way, the terminal device can send same data on a plurality of logical channels on a direct link, so that reliability of data transmission performed in the direct link transmission manner can be ensured.

FIG. 13 is a schematic flowchart of another method for repeatedly transmitting data according to an embodiment of this application. As shown in FIG. 13, the method includes the following steps.

501. A network device sends first RRC signaling to a terminal device, where the first RRC signaling includes a correspondence between a PDCP entity and N logical channels, the correspondence is a reference element used by the terminal device to separately send one piece of data in the PDCP entity to the N logical channels, a direct link transmission manner is used on at least one of the N logical channels, and N is a positive integer greater than or equal to 2.

In an optional implementation, the N logical channels correspond to L RLC entities, each of the L RLC entities corresponds to at least one of the N logical channels, different RLC entities in the L RLC entities correspond to different logical channels, and L is a positive integer less than or equal to N.

For this step, refer to step 101 in FIG. 3. Details are not described herein again.

In this embodiment, the network device sends the first RRC signaling to the terminal device, where the first RRC signaling includes the correspondence between the PDCP entity and the N logical channels, the correspondence is the reference element used by the terminal device to separately send the data in the PDCP entity to the N logical channels, the direct link transmission manner is used on the at least one of the N logical channels, and N is a positive integer greater than or equal to 2; the terminal device separately sends the data in the PDCP entity to the N logical channels; the terminal device obtains a resource; and the terminal device sends the data on the N logical channels by using the obtained resource. There is the correspondence between the L RLC entities and the N logical channels. Therefore, when terminal devices communicate with each other in a direct link manner, if the terminal device separately sends the data in the PDCP entity to the L RLC entities corresponding to the N logical channels, the data in the PDCP entity is sent to the N logical channels, so that the terminal device can send the data on the N logical channels by using the obtained resource. In this way, the terminal device can send same data on a plurality of logical channels on a direct link, so that reliability of data transmission performed in the direct link transmission manner can be ensured.

According to the foregoing embodiment, the method provided in FIG. 13 may further include at least one of the following steps.

502. The network device sends resource configuration signaling to the terminal device, where the resource configuration signaling is used to indicate a resource dynamically scheduled or semi-dynamically scheduled by the network device for the terminal device.

For this embodiment, refer to step 203 in FIG. 7. Details are not described herein again.

503. Before step 501, the network device sends first configuration information to the terminal device, where the first configuration information includes condition information, and the condition information is used to trigger the terminal device to separately send the data in the PDCP entity to the N logical channels.

For this embodiment, refer to step 201 in FIG. 7. Details are not described herein again. In addition, for details, refer to the description in step 203 in FIG. 7.

504. The network device sends third indication information to the terminal device, where the third indication information represents a transmission mode of each of the N logical channels.

In this embodiment, the network device sends the third indication information to the terminal device, and the third indication information indicates respective transmission modes of the N logical channels. The transmission mode of each logical channel may be one of a unicast mode, a multicast mode, and a broadcast mode.

Figure 14:
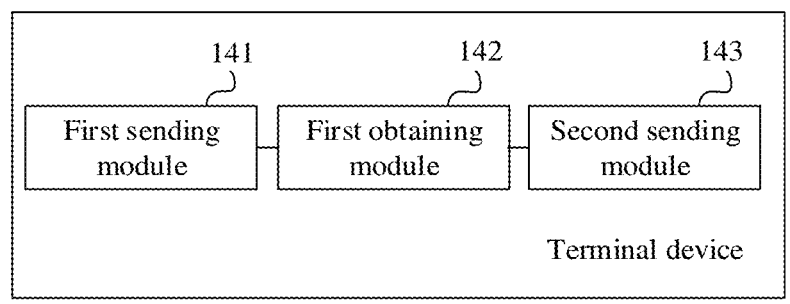
FIG. 14 is a schematic structural diagram of a terminal device according to an embodiment of this application.

FIG. 14 is a schematic structural diagram of a terminal device according to an embodiment of this application. As shown in FIG. 14, the terminal device includes a first sending module 141, a first obtaining module 142, and a second sending module 143.

The first sending module 141 is configured to separately send one piece of data in a PDCP entity to N logical channels, where a direct link transmission manner is used on at least one of the N logical channels, and N is a positive integer greater than or equal to 2.

The first obtaining module 142 is configured to obtain a resource.

The second sending module 143 is configured to send the data on the N logical channels by using the obtained resource.

The first sending module 141 may perform step 101 in the method shown in FIG. 3, the first obtaining module 142 may perform step 102 in the method shown in FIG. 3, and the second sending module 143 may perform step 103 in the method shown in FIG. 3.

In an optional implementation, there is a correspondence between the PDCP entity and the N logical channels, and the terminal device further includes: a second obtaining module, configured to: before the first sending module 141 separately sends the data in the PDCP entity to the N logical channels, receive first RRC signaling sent by a network device, and obtain the correspondence by using the first RRC signaling; or a first determining module, configured to determine the correspondence before the first sending module 141 separately sends the data in the PDCP entity to the N logical channels.

In an optional implementation, the first sending module 141 is specifically configured to separately send the data in the PDCP entity to L RLC entities corresponding to the N logical channels, where each of the L RLC entities corresponds to at least one of the N logical channels, different RLC entities in the L RLC entities correspond to different logical channels, and L is a positive integer less than or equal to N.

Correspondingly, the second sending module 143 is specifically configured to send, by using the obtained resource, the data in the L RLC entities corresponding to the N logical channels.

In this embodiment, the terminal device in the embodiment shown in FIG. 14 may be configured to execute the technical solutions of the embodiments shown in FIG. 3 to FIG. 6 in the foregoing methods. Implementation principles and technical effects of the terminal device are similar to those in the foregoing embodiments, and details are not described herein again.

In this embodiment, the terminal device separately sends the data in the PDCP entity to the N logical channels, where the direct link transmission manner is used on the at least one of the N logical channels, and N is a positive integer greater than or equal to 2; the terminal device obtains the resource; and the terminal device sends the data on the N logical channels by using the obtained resource. Optionally, each of the L RLC entities corresponds to the at least one of the N logical channels, different RLC entities in the L RLC entities correspond to different logical channels, and L is a positive integer less than or equal to N. There is the correspondence between the L RLC entities and the N logical channels. Therefore, when terminal devices communicate with each other in a direct link manner, if the terminal device separately sends the data in the PDCP entity to the L RLC entities corresponding to the N logical channels, the data in the PDCP entity is sent to the N logical channels, so that the terminal device can send the data on the N logical channels by using the obtained resource. In this way, the terminal device can send same data on a plurality of logical channels on a direct link, so that reliability of data transmission performed in the direct link transmission manner can be ensured.

Based on the embodiment shown in FIG. 14, a third resource set is included in second RRC signaling, and the third resource set includes N resource pools. For details, refer to the steps of the methods provided in FIG. 11 and FIG. 12.

Figure 15:
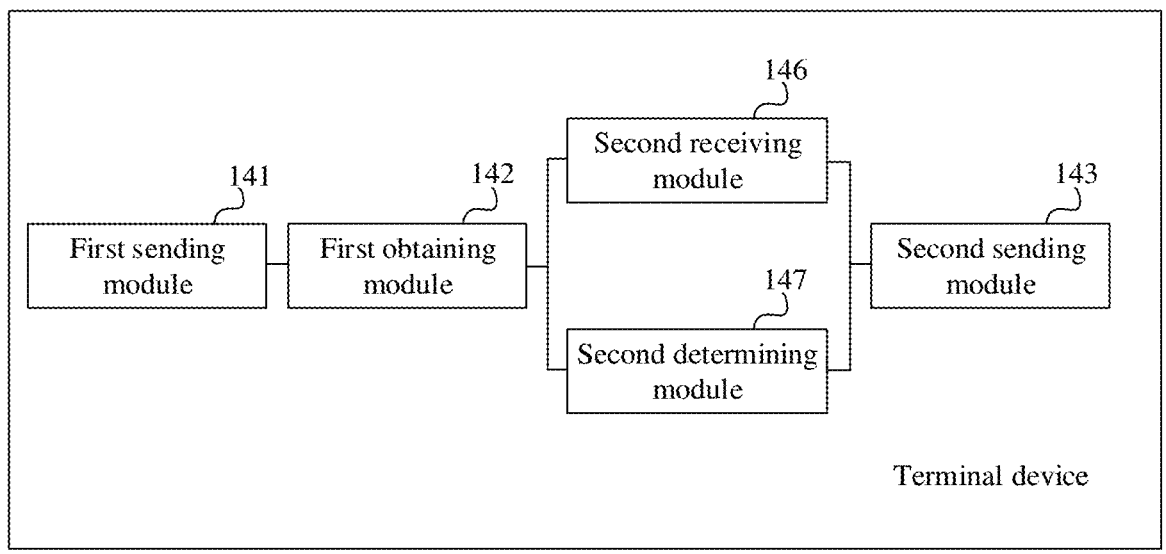
FIG. 15 is a schematic structural diagram of another terminal device according to an embodiment of this application.

FIG. 15 is a schematic structural diagram of another terminal device according to an embodiment of this application. Based on FIG. 14, the terminal device further includes: a second receiving module 146, configured to: before the second sending module 143 sends the data on the N logical channels by using the obtained resource, receive third indication information sent by the network device, where the third indication information represents a transmission mode of each of the N logical channels; or a second determining module 147, configured to determine a transmission mode of each of the N logical channels before the second sending module 143 sends the data on the N logical channels by using the obtained resource.

The second receiving module 146 may perform step 104 in the method shown in FIG. 3, or the second determining module 147 may perform step 104 in the method shown in FIG. 3.

In this embodiment, the terminal device in the embodiment shown in FIG. 15 may be configured to execute the technical solutions of the embodiments shown in FIG. 3 to FIG. 6 in the foregoing methods. Implementation principles and technical effects of the terminal device are similar to those in the foregoing embodiments, and details are not described herein again.

In this embodiment, the terminal device sends the data in the PDCP entity to the N logical channels, where the direct link transmission manner is used on the at least one of the N logical channels, and N is a positive integer greater than or equal to 2; the terminal device obtains the resource; and the terminal device sends the data on the N logical channels by using the obtained resource. Therefore, when terminal devices communicate with each other in a direct link manner, the terminal device sends the data in the PDCP entity to the N logical channels, so that the terminal device can send the data on the N logical channels by using the obtained resource. In this way, the terminal device can send same data on a plurality of logical channels on a direct link, so that reliability of data transmission performed in the direct link transmission manner can be ensured.

Figure 16:
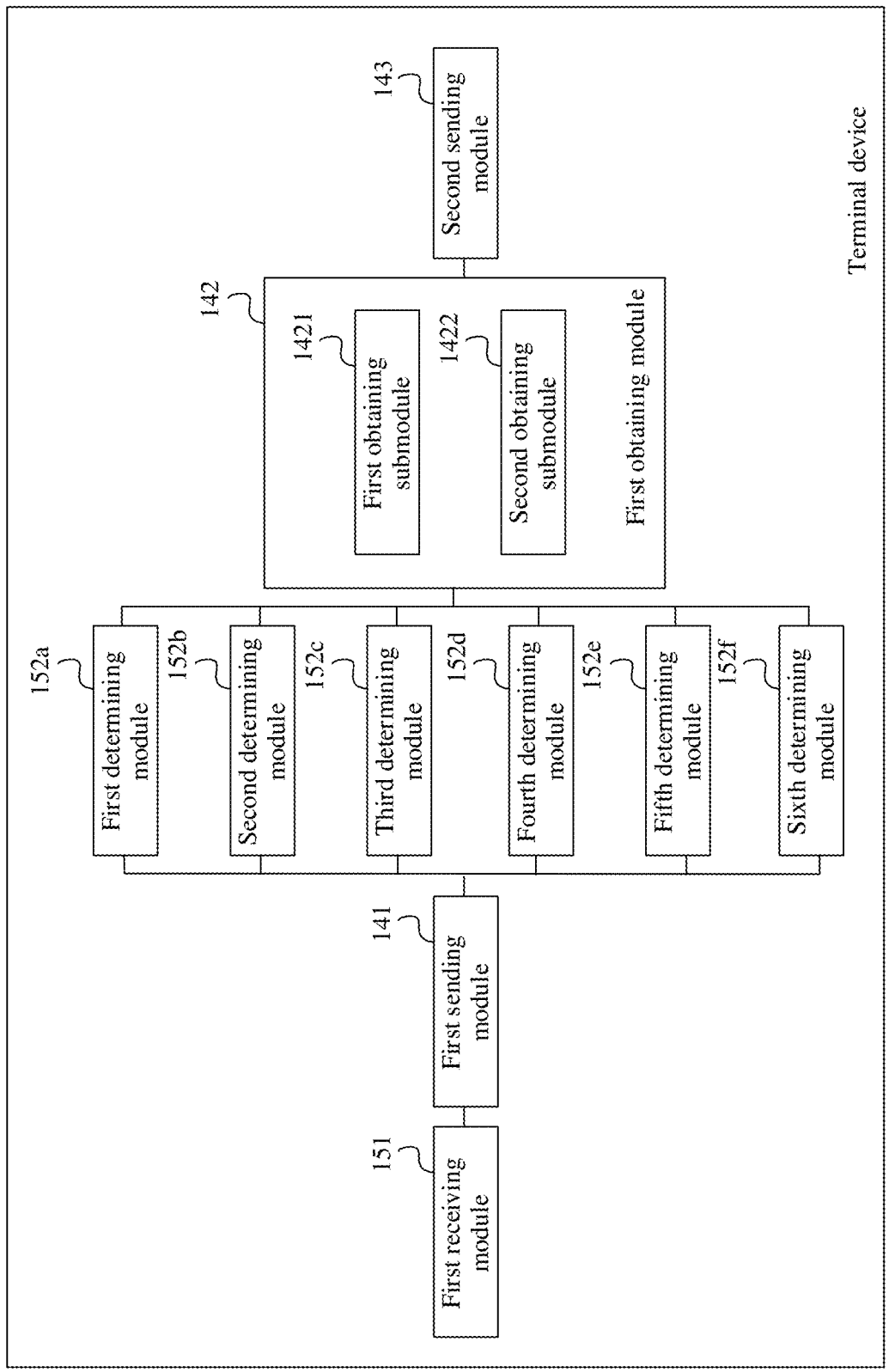
FIG. 16 is a schematic structural diagram of still another terminal device according to an embodiment of this application.

FIG. 16 is a schematic structural diagram of still another terminal device according to an embodiment of this application. Based on FIG. 14, as shown in FIG. 16, the first obtaining module 142 includes: a first obtaining submodule 1421, configured to: receive resource configuration signaling sent by the network device, where the resource configuration signaling is used to indicate a resource dynamically scheduled or semi-dynamically scheduled by the network device for the terminal device; and obtain the resource; or a second obtaining submodule 1422, configured to obtain the resource from any one of a first resource set, a second resource set, and a third resource set, where the first resource set includes at least one resource pool, the second resource set includes at least one resource pool, and the third resource set includes at least one resource pool.

The first obtaining submodule 1421 may perform the implementation 1 of step 203 in the method shown in FIG. 7, and the second obtaining submodule 1422 may perform the implementation 2 of step 203 in the method shown in FIG. 7.

The terminal device provided in this embodiment further includes: a first receiving module 151, configured to: before the first sending module 141 separately sends the data in the PDCP entity to the N logical channels, receive first configuration information sent by the network device, where the first configuration information includes condition information, and the condition information is used to trigger the terminal device to separately send the data in the PDCP entity to the N logical channels.

In the first receiving module 151, the condition information includes that a service priority and service priority information meet a first specific relationship.

The service priority information is a service priority threshold or a service priority range.

When the service priority information is the service priority threshold, the first specific relationship is that the service priority is greater than the service priority threshold, the service priority is equal to the service priority threshold, or the service priority is greater than or equal to the service priority threshold; or when the service priority information is the service priority range, the first specific relationship is that the service priority is within the service priority range.

The service priority is a priority of the data or a priority of a MAC PDU that includes the data.

In this case, the terminal device further includes: a first determining module 152a, configured to: before the first obtaining module 142 obtains the resource, determine that the first resource set includes a first resource pool, where the first resource pool is a resource pool corresponding to the service priority information.

Alternatively, in the first receiving module 151, the condition information includes that a channel congestion degree of a second resource pool and first channel congestion information meet a second specific relationship.

The first channel congestion information is a first channel congestion threshold or a first channel congestion range.

When the first channel congestion information is the first channel congestion threshold, the second specific relationship is that the channel congestion degree of the second resource pool is greater than the first channel congestion threshold, the channel congestion degree of the second resource pool is equal to the first channel congestion threshold, or the channel congestion degree of the second resource pool is greater than or equal to the first channel congestion threshold; or when the first channel congestion information is the first channel congestion range, the second specific relationship is that the channel congestion degree of the second resource pool is within the first channel congestion range.

In this case, the terminal device further includes: a second determining module 152b, configured to: before the first obtaining module 142 obtains the resource, determine that the first resource set includes the second resource pool, where the second resource pool is a resource pool corresponding to the first channel congestion information.

Alternatively, in the first receiving module 151, the condition information includes that a channel congestion degree of K logical channels and branch channel congestion information meet a third specific relationship.

The branch channel congestion information is a branch channel congestion threshold or a branch channel congestion range.

When the branch channel congestion information is the branch channel congestion threshold, the third specific relationship is that the channel congestion degree of the K logical channels is greater than the branch channel congestion threshold, the channel congestion degree of the K logical channels is equal to the branch channel congestion threshold, or the channel congestion degree of the K logical channels is greater than or equal to the branch channel congestion threshold; or when the branch channel congestion information is the branch channel congestion range, the third specific relationship is that the channel congestion degree of the K logical channels is within the branch channel congestion range.

The channel congestion degree of the K logical channels includes any one of the following: a minimum value in channel congestion degrees of all resource pools used on the K logical channels, a maximum value in the channel congestion degrees of all the resource pools used on the K logical channels, and an average value of the channel congestion degrees of all the resource pools used on the K logical channels.

The terminal device further includes: a third determining module 152c, configured to: before the first obtaining module 142 obtains the resource, determine that the first resource set includes a third resource pool, where the third resource pool is a resource pool corresponding to the branch channel congestion information.

Alternatively, in the first receiving module 151, the condition information includes first indication information.

In addition, the first indication information points to a resource pool that can be used when the terminal device repeatedly transmits the data.

In this case, the terminal device further includes: a fourth determining module 152d, configured to: before the first obtaining module 142 obtains the resource, determine that the first resource set includes a fourth resource pool, where the fourth resource pool is a resource pool corresponding to the first indication information.

Alternatively, in the first receiving module 151, the condition information includes at least one carrier sequence, and each carrier sequence includes at least one carrier.

In addition, each carrier sequence points to a resource pool that can be used when the terminal device repeatedly transmits the data.

In this case, the terminal device further includes: a fifth determining module 152e, configured to: before the first obtaining module 142 obtains the resource, determine that the first resource set includes a fifth resource pool, where the fifth resource pool is a resource pool corresponding to each carrier sequence.

Alternatively, in the first receiving module 151, the condition information includes any combination of at least one of the following: that a service priority and service priority information meet a first specific relationship, that a channel congestion degree of a second resource pool and first channel congestion information meet a second specific relationship, that a channel congestion degree of K logical channels and branch channel congestion information meet a third specific relationship, first indication information, and at least one carrier sequence.

In this case, the terminal device further includes: a sixth determining module 152f, configured to: before the first obtaining module 142 obtains the resource, determine that the first resource set includes a sixth resource pool, where the sixth resource pool is a resource pool meeting a requirement of the foregoing combination.

Alternatively, in the first receiving module 151, the condition information includes second indication information.

The first receiving module 151 may perform step 201 in the method shown in FIG. 7.

In this embodiment, the terminal device in the embodiment shown in FIG. 16 may be configured to execute the technical solutions of the embodiments shown in FIG. 7 and FIG. 8 in the foregoing methods. Implementation principles and technical effects of the terminal device are similar to those in the foregoing embodiments, and details are not described herein again.

In this embodiment, the terminal device receives the first configuration information sent by the network device, where the first configuration information includes the condition information, the condition information is used to trigger the terminal device to separately send the data in the PDCP entity to the N logical channels, and N is a positive integer greater than or equal to 2; the terminal device separately sends the data in the PDCP entity to the N logical channels, where the direct link transmission manner is used on the at least one of the N logical channels; the terminal device obtains the resource; and the terminal device sends the data on the N logical channels by using the obtained resource. There is the correspondence between the L RLC entities and the N logical channels. Therefore, when terminal devices communicate with each other in a direct link manner, if the terminal device separately sends the data in the PDCP entity to the L RLC entities corresponding to the N logical channels, the data in the PDCP entity is sent to the N logical channels, so that the terminal device can send the data on the N logical channels by using the obtained resource. In this way, the terminal device can send same data on a plurality of logical channels on a direct link, so that reliability of data transmission performed in the direct link transmission manner can be ensured. In addition, the terminal device obtains, from the network device, a condition of repeatedly transmitting the data, and then repeatedly transmits the data based on the condition of repeatedly transmitting the data.

Figure 17:
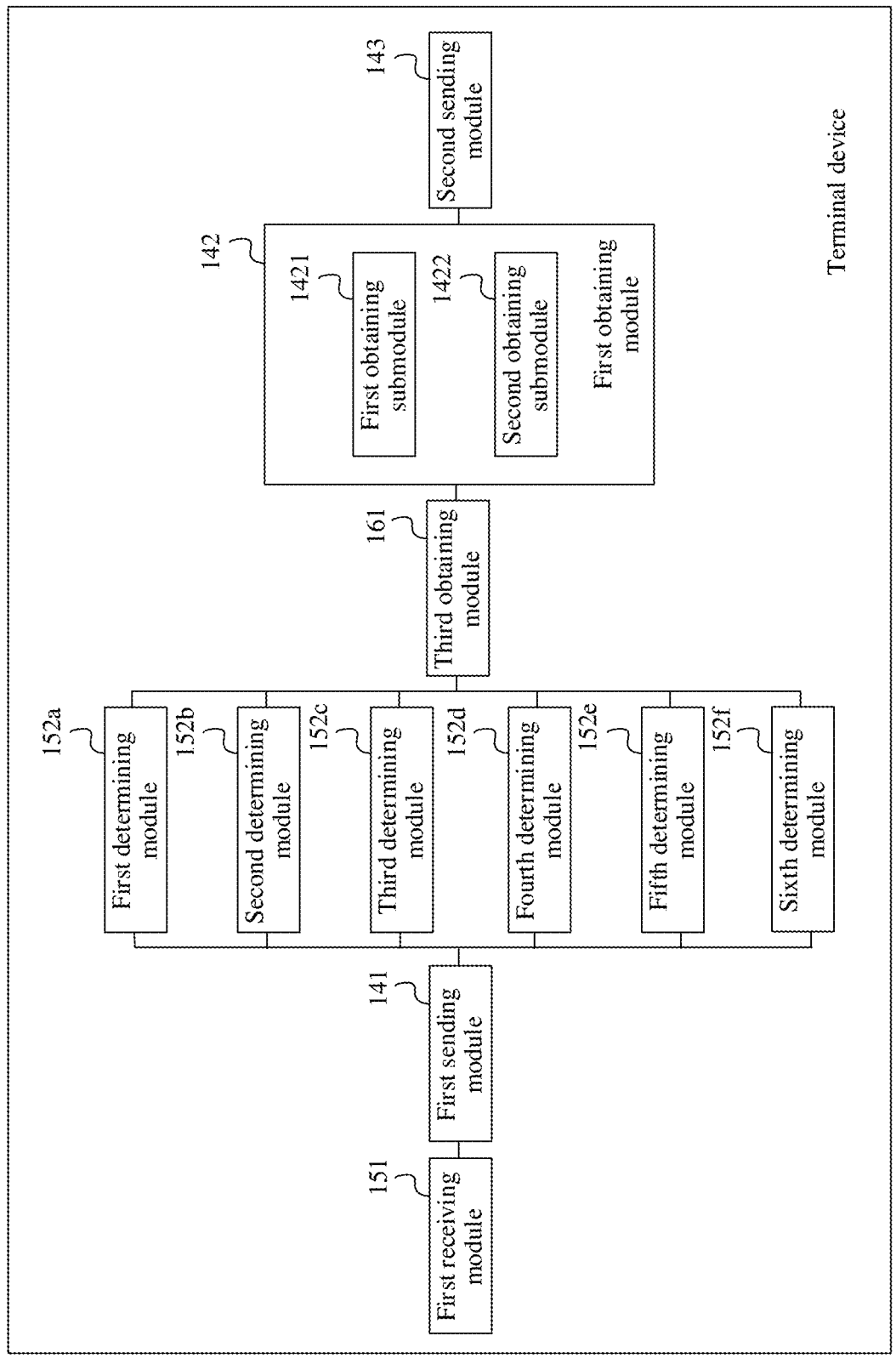
FIG. 17 is a schematic structural diagram of yet another terminal device according to an embodiment of this application.

FIG. 17 is a schematic structural diagram of yet another terminal device according to an embodiment of this application. Based on FIG. 16, as shown in FIG. 17, the terminal device further includes: a third obtaining module 161, configured to: after the first determining module 152a, the second determining module 152b, the third determining module 152c, the fourth determining module 152d, or the fifth determining module 152e determines a resource pool included in the first resource set, obtain the second resource set from the first resource set based on at least one of terminal location information, terminal speed information, a carrier restriction condition, and a congestion condition, where the second resource set includes M resource pools, and M is an integer greater than or equal to 1.

The terminal location information is used to indicate that the M resource pools meet a location information requirement of the terminal device.

The terminal speed information is used to indicate that the M resource pools meet a speed information requirement of the terminal device.

The carrier restriction condition is used to indicate that the M resource pools respectively belong to different carriers.

The congestion condition includes that a channel congestion degree of the M resource pools and second channel congestion information meet a fourth specific relationship, the second channel congestion information is a second channel congestion threshold or a second channel congestion range, and when the second channel congestion information is the second channel congestion threshold, the fourth specific relationship is that the channel congestion degree of the M resource pools is greater than the second channel congestion threshold, the channel congestion degree of the M resource pools is equal to the second channel congestion threshold, or the channel congestion degree of the M resource pools is greater than or equal to the second channel congestion threshold; or when the second channel congestion information is the second channel congestion range, the fourth specific relationship is that the channel congestion degree of the M resource pools is within the second channel congestion range.

The channel congestion degree of the M resource pools is any one of the following: a minimum value in channel congestion degrees of all of the M resource pools, a maximum value in the channel congestion degrees of all of the M resource pools, and an average value of the channel congestion degrees of all of the M resource pools.

The third obtaining module 161 may perform step 301 in the method shown in FIG. 9.

In an optional implementation, M is equal to N.

In this embodiment, the terminal device in the embodiment shown in FIG. 17 may be configured to execute the technical solutions of the embodiments shown in FIG. 9 and FIG. 10 in the foregoing methods. Implementation principles and technical effects of the terminal device are similar to those in the foregoing embodiments, and details are not described herein again.

In this embodiment, the terminal device receives the first configuration information sent by the network device, where the first configuration information includes the condition information, the condition information is used to trigger the terminal device to separately send the data in the PDCP entity to the N logical channels, and N is a positive integer greater than or equal to 2; the terminal device determines each resource pool included in the first resource set; the terminal device obtains the second resource set from the first resource set based on at least one of the terminal location information, the terminal speed information, the carrier restriction condition, and the congestion condition; the terminal device separately sends the data in the PDCP entity to the N logical channels, where the direct link transmission manner is used on the at least one of the N logical channels; the terminal device obtains the resource from the second resource set; and the terminal device sends the data on the N logical channels by using the obtained resource. There is the correspondence between the L RLC entities and the N logical channels. Therefore, when terminal devices communicate with each other in a direct link manner, if the terminal device separately sends the data in the PDCP entity to the L RLC entities corresponding to the N logical channels, the data in the PDCP entity is sent to the N logical channels, so that the terminal device can send the data on the N logical channels by using the obtained resource. In this way, the terminal device can send same data on a plurality of logical channels on a direct link, so that reliability of data transmission performed in the direct link transmission manner can be ensured. In addition, the terminal device obtains, from the network device, a condition of repeatedly transmitting the data, and then repeatedly transmits the data based on the condition of repeatedly transmitting the data.

Figure 18:
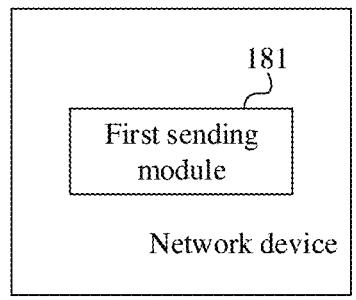
FIG. 18 is a schematic structural diagram of a network device according to an embodiment of this application.

FIG. 18 is a schematic structural diagram of a network device according to an embodiment of this application. As shown in FIG. 18, the terminal device includes a first sending module 181.

The first sending module 181 is configured to send first RRC signaling to a terminal device, where the first RRC signaling includes a correspondence between a PDCP entity and N logical channels, the correspondence is a reference element used by the terminal device to separately send one piece of data in the PDCP entity to the N logical channels, a direct link transmission manner is used on at least one of the N logical channels, and N is a positive integer greater than or equal to 2.

In an optional implementation, the N logical channels correspond to L RLC entities, each of the L RLC entities corresponds to at least one of the N logical channels, different RLC entities in the L RLC entities correspond to different logical channels, and L is a positive integer less than or equal to N.

The first sending module 181 may perform step 501 in the method shown in FIG. 13.

In this embodiment, the network device in the embodiment shown in FIG. 18 may be configured to execute the technical solutions of the embodiment shown in FIG. 13 in the foregoing method. Implementation principles and technical effects of the network device are similar to those in the foregoing embodiment, and details are not described herein again.

In this embodiment, the network device sends the first RRC signaling to the terminal device, where the first RRC signaling includes the correspondence between the PDCP entity and the N logical channels, the correspondence is the reference element used by the terminal device to separately send the data in the PDCP entity to the N logical channels, the direct link transmission manner is used on the at least one of the N logical channels, and N is a positive integer greater than or equal to 2; the terminal device separately sends the data in the PDCP entity to the N logical channels; the terminal device obtains a resource; and the terminal device sends the data on the N logical channels by using the obtained resource. There is the correspondence between the L RLC entities and the N logical channels. Therefore, when terminal devices communicate with each other in a direct link manner, if the terminal device separately sends the data in the PDCP entity to the L RLC entities corresponding to the N logical channels, the data in the PDCP entity is sent to the N logical channels, so that the terminal device can send the data on the N logical channels by using the obtained resource. In this way, the terminal device can send same data on a plurality of logical channels on a direct link, so that reliability of data transmission performed in the direct link transmission manner can be ensured.

Based on the embodiment shown in FIG. 18, the network device may further include at least one of the following modules.

A second sending module is configured to send resource configuration signaling to the terminal device, where the resource configuration signaling is used to indicate a resource dynamically scheduled or semi-dynamically scheduled by the network device for the terminal device.

The second sending module may perform step 502 in the method shown in FIG. 13.

A third sending module is configured to send first configuration information to the terminal device before the first sending module 181 sends the first RRC signaling to the terminal device, where the first configuration information includes condition information, and the condition information is used to trigger the terminal device to separately send the data in the PDCP entity to the N logical channels.

The third sending module may perform step 503 in the method shown in FIG. 13.

A fourth sending module is configured to send third indication information to the terminal device, where the third indication information represents a transmission mode of each of the N logical channels.

The fourth sending module may perform step 504 in the method shown in FIG. 13.

Figure 19:
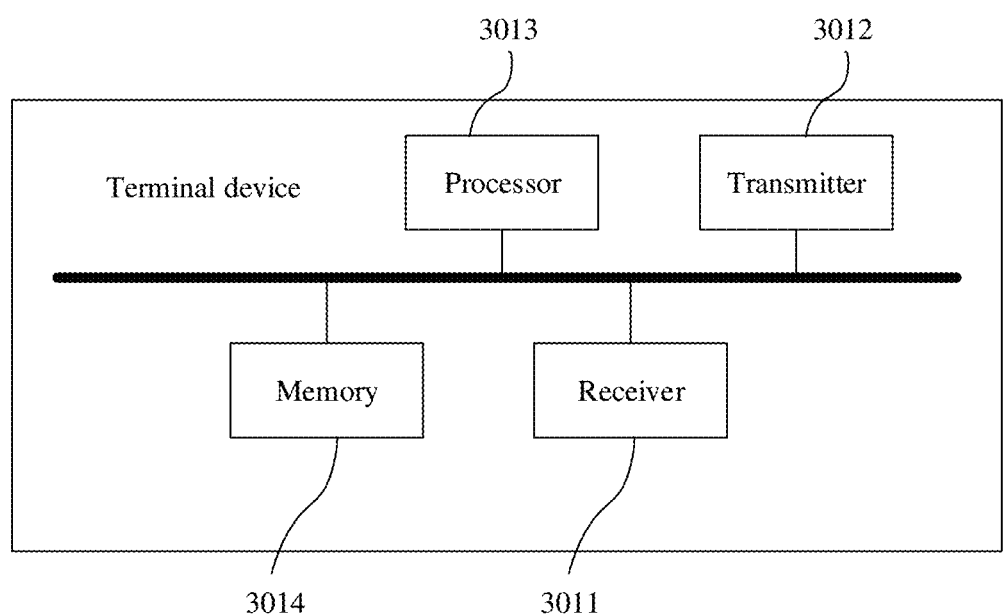
FIG. 19 is a schematic structural diagram of another terminal device according to an embodiment of this application.

FIG. 19 is a schematic structural diagram of another terminal device according to an embodiment of this application. As shown in FIG. 19, the terminal device may be configured to perform the actions or steps of the terminal device in the embodiments shown in FIG. 3 to FIG. 12. The terminal device includes a receiver 3011, a transmitter 3012, a processor 3013, and a memory 3014.

The memory 3014 is configured to store a program.

The processor 3013 is configured to separately send one piece of data in a PDCP entity to N logical channels, where a direct link transmission manner is used on at least one of the N logical channels, and N is a positive integer greater than or equal to 2.

The processor 3013 is further configured to obtain a resource.

The transmitter 3012 is configured to send the data on the N logical channels by using the obtained resource.

In an optional implementation, the processor 3013 is specifically configured to: separately send the data in the PDCP entity to L RLC entities corresponding to the N logical channels, where each of the L RLC entities corresponds to at least one of the N logical channels, different RLC entities in the L RLC entities correspond to different logical channels, and L is a positive integer less than or equal to N; and the transmitter 3012 is specifically configured to send, by using the obtained resource, the data in the L RLC entities corresponding to the N logical channels.

In an optional implementation, there is a correspondence between the PDCP entity and the N logical channels; and the correspondence is obtained by the processor 3013 by using first RRC signaling, or the correspondence is determined by the processor 3013.

In an optional implementation, the terminal device further includes the receiver 3011, and the receiver 3011 is configured to: receive resource configuration signaling sent by a network device, where the resource configuration signaling is used to indicate a resource dynamically scheduled or semi-dynamically scheduled by the network device for the terminal device; and obtain the resource; or the processor 3013 is specifically configured to obtain the resource from any one of a first resource set, a second resource set, and a third resource set, where the first resource set includes at least one resource pool, the second resource set includes at least one resource pool, and the third resource set includes at least one resource pool.

In an optional implementation, the receiver 3011 is further configured to: before the processor 3013 separately sends the data in the PDCP entity to the N logical channels, receive first configuration information sent by the network device, where the first configuration information includes condition information, and the condition information is used to trigger the processor 3013 to separately send the data in the PDCP entity to the N logical channels.

In an optional implementation, the condition information includes that a service priority and service priority information meet a first specific relationship; the service priority information is a service priority threshold or a service priority range; when the service priority information is the service priority threshold, the first specific relationship is that the service priority is greater than the service priority threshold, the service priority is equal to the service priority threshold, or the service priority is greater than or equal to the service priority threshold; or when the service priority information is the service priority range, the first specific relationship is that the service priority is within the service priority range; the service priority is a priority of the data or a priority of a MAC PDU that includes the data; and the processor 3013 is further configured to: before the processor 3013 obtains the resource, determine that the first resource set includes a first resource pool, where the first resource pool is a resource pool corresponding to the service priority information.

Alternatively, the condition information includes that a channel congestion degree of a second resource pool and first channel congestion information meet a second specific relationship; the first channel congestion information is a first channel congestion threshold or a first channel congestion range; when the first channel congestion information is the first channel congestion threshold, the second specific relationship is that the channel congestion degree of the second resource pool is greater than the first channel congestion threshold, the channel congestion degree of the second resource pool is equal to the first channel congestion threshold, or the channel congestion degree of the second resource pool is greater than or equal to the first channel congestion threshold; or when the first channel congestion information is the first channel congestion range, the second specific relationship is that the channel congestion degree of the second resource pool is within the first channel congestion range; and the processor 3013 is further configured to: before the processor 3013 obtains the resource, determine that the first resource set includes the second resource pool, where the second resource pool is a resource pool corresponding to the first channel congestion information.

Alternatively, the condition information includes that a channel congestion degree of K logical channels and branch channel congestion information meet a third specific relationship; the branch channel congestion information is a branch channel congestion threshold or a branch channel congestion range; when the branch channel congestion information is the branch channel congestion threshold, the third specific relationship is that the channel congestion degree of the K logical channels is greater than the branch channel congestion threshold, the channel congestion degree of the K logical channels is equal to the branch channel congestion threshold, or the channel congestion degree of the K logical channels is greater than or equal to the branch channel congestion threshold; or when the branch channel congestion information is the branch channel congestion range, the third specific relationship is that the channel congestion degree of the K logical channels is within the branch channel congestion range; the channel congestion degree of the K logical channels includes any one of the following: a minimum value in channel congestion degrees of all resource pools used on the K logical channels, a maximum value in the channel congestion degrees of all the resource pools used on the K logical channels, and an average value of the channel congestion degrees of all the resource pools used on the K logical channels; and the processor 3013 is further configured to: before the processor 3013 obtains the resource, determine that the first resource set includes a third resource pool, where the third resource pool is a resource pool corresponding to the branch channel congestion information.

Alternatively, the condition information includes first indication information, and the first indication information points to a resource pool that can be used when the terminal device repeatedly transmits the data; and the processor 3013 is further configured to: before the processor 3013 obtains the resource, determine that the first resource set includes a fourth resource pool, where the fourth resource pool is a resource pool corresponding to the first indication information.

Alternatively, the condition information includes at least one carrier sequence, each carrier sequence includes at least one carrier, and each carrier sequence points to a resource pool that can be used when the terminal device repeatedly transmits the data; and the processor 3013 is further configured to: before the processor 3013 obtains the resource, determine that the first resource set includes a fifth resource pool, where the fifth resource pool is a resource pool corresponding to each carrier sequence.

Alternatively, the condition information includes second indication information.

In an optional implementation, the processor 3013 is further configured to: after the processor 3013 determines a resource pool included in the first resource set, obtain the second resource set from the first resource set based on at least one of terminal location information, terminal speed information, a carrier restriction condition, and a congestion condition, where the second resource set includes M resource pools, and M is an integer greater than or equal to 1, where the terminal location information is used to indicate that the M resource pools meet a location information requirement of the terminal device; the terminal speed information is used to indicate that the M resource pools meet a speed information requirement of the terminal device; the carrier restriction condition is used to indicate that the M resource pools respectively belong to different carriers; the congestion condition includes that a channel congestion degree of the M resource pools and second channel congestion information meet a fourth specific relationship, the second channel congestion information is a second channel congestion threshold or a second channel congestion range, and when the second channel congestion information is the second channel congestion threshold, the fourth specific relationship is that the channel congestion degree of the M resource pools is greater than the second channel congestion threshold, the channel congestion degree of the M resource pools is equal to the second channel congestion threshold, or the channel congestion degree of the M resource pools is greater than or equal to the second channel congestion threshold; or when the second channel congestion information is the second channel congestion range, the fourth specific relationship is that the channel congestion degree of the M resource pools is within the second channel congestion range; and the channel congestion degree of the M resource pools is any one of the following: a minimum value in channel congestion degrees of all of the M resource pools, a maximum value in the channel congestion degrees of all of the M resource pools, and an average value of the channel congestion degrees of all of the M resource pools.

In an optional implementation, the third resource set is included in second RRC signaling, and the third resource set includes N resource pools.

In an optional implementation, the receiver 3011 is further configured to: before the processor 3013 sends the data on the N logical channels by using the obtained resource, receive third indication information sent by the network device, where the third indication information represents a transmission mode of each of the N logical channels; or the processor 3013 is further configured to determine a transmission mode of each of the N logical channels before the processor 3013 sends the data on the N logical channels by using the obtained resource.

The terminal device in the embodiment shown in FIG. 19 may be configured to: execute the technical solutions of the embodiments in the methods shown in FIG. 3 to FIG. 12, or execute a program of each module in the embodiments shown in FIG. 14 to FIG. 17. Implementation principles and technical effects of the terminal device are similar to those in the foregoing embodiments, and details are not described herein again. In the embodiments of this application, reference may be made to each other for the foregoing embodiments. Same or similar steps and nouns are not described one by one again.

The receiver 3011 and the transmitter 3012 may be connected to an antenna. In a downlink direction, the receiver 3011 receives, by using the antenna, information sent by the network device, and the transmitter 3012 sends the information to the processor 3013 by using the antenna for processing. In an uplink direction, the processor 3013 processes data of the terminal device, and transmits the data to the network device by using the transmitter 3012.

The memory 3014 is configured to store programs for implementing the foregoing method embodiments or the modules in the embodiment shown in FIG. 19, and the processor 3013 invokes the programs to perform the operations in the foregoing method embodiments, to implement the modules shown in FIG. 19.

Alternatively, some or all of the foregoing modules may be implemented in a form of an integrated circuit that is embedded in a chip of the terminal device. In addition, the modules may be independently implemented, or may be integrated together. To be specific, the foregoing modules may be configured as one or more integrated circuits for performing the foregoing methods, for example, one or more application-specific integrated circuits (application-specific integrated circuit, ASIC), one or more microprocessors (digital signal processor, DSP), or one or more field programmable gate arrays (field programmable gate array, FPGA).

Figure 20:
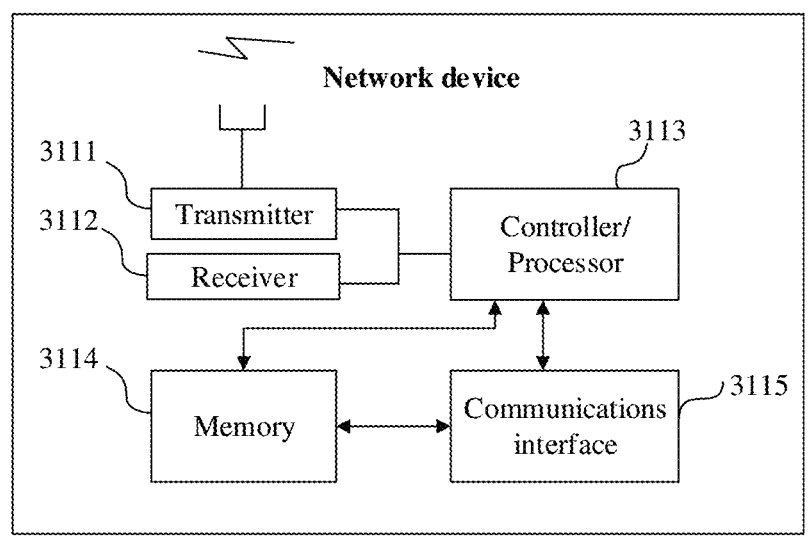
FIG. 20 is a schematic structural diagram of another network device according to an embodiment of this application.

FIG. 20 is a schematic structural diagram of another network device according to an embodiment of this application. As shown in FIG. 20, the network device may be configured to perform the actions or steps of the network device in the embodiment shown in FIG. 13. The network device includes a transmitter 3111, a receiver 3112, and a processor 3113.

The transmitter 3111 is configured to send first RRC signaling to a terminal device, where the first RRC signaling includes a correspondence between a PDCP entity and N logical channels, the correspondence is a reference element used by the terminal device to separately send one piece of data in the PDCP entity to the N logical channels, a direct link transmission manner is used on at least one of the N logical channels, and N is a positive integer greater than or equal to 2.

In an optional implementation, the transmitter 3111 is further configured to: send resource configuration signaling to the terminal device, where the resource configuration signaling is used to indicate a resource dynamically scheduled or semi-dynamically scheduled by the network device for the terminal device.

In an optional implementation, the transmitter 3111 is further configured to: send first configuration information to the terminal device before the transmitter 3111 sends the first RRC signaling to the terminal device, where the first configuration information includes condition information, and the condition information is used to trigger the terminal device to separately send the data in the PDCP entity to the N logical channels.

In an optional implementation, the transmitter 3111 is further configured to: send third indication information to the terminal device, where the third indication information represents a transmission mode of each of the N logical channels.

The network device in the embodiment shown in FIG. 20 may be configured to: execute the technical solutions of the embodiment in the method shown in FIG. 13, or execute a program of each module in the embodiment shown in FIG. 18. Implementation principles and technical effects of the network device are similar to those in the foregoing embodiments, and details are not described herein again. In the embodiments of this application, reference may be made to each other for the foregoing embodiments. Same or similar steps and nouns are not described one by one again.

The processor 3113 invokes the program to perform the operations in the foregoing method embodiment, to implement the modules shown in FIG. 20.

The processor 3113 may alternatively be a controller, and is represented as a "controller/processor 3113" in FIG. 20. The transmitter 3111 and the receiver 3112 are configured to: support the network device in transmitting information to and receiving information from the terminal device in the foregoing embodiment, and support wireless communication between the terminal device and another terminal device. The processor 3113 performs various functions used to communicate with the terminal device.

Further, the network device may include a memory 3114. The memory 3114 is configured to store program code and data of the network device. In addition, the network device may further include a communications interface 3115. The communications interface 3115 is configured to support the network device in communicating with another network entity.

The processor 3113, for example, may be a central processing unit (central processing unit, CPU), or may be one or more integrated circuits configured to implement the foregoing method, for example, one or more specific integrated circuits, one or more microprocessors, or one or more field programmable gate arrays. The memory 3114 may be one memory, or may be a general name of a plurality of storage elements.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

A person skilled in the art should be aware that in the foregoing one or more examples, functions described in the embodiments of this application may be implemented by hardware, software, firmware, or any combination thereof. When the functions are implemented by software, the functions may be stored in a computer-readable medium or transmitted as one or more instructions or code in the computer-readable medium. The computer-readable medium includes a computer storage medium and a communications medium. The communications medium includes any medium that enables a computer program to be transmitted from one place to another. The storage medium may be any available medium accessible to a general-purpose or dedicated computer.

What is claimed is:

1. A method, comprising:
obtaining or determining, by a terminal device, a correspondence between a packet data convergence protocol (PDCP) entity and N logical channels, wherein the correspondence is obtained by the terminal device using first radio resource control (RRC) signaling, or the correspondence is determined by the terminal device;
separately sending, by the terminal device, one piece of data in the PDCP entity to each of the N logical channels, wherein a direct link transmission manner is used on at least one of the N logical channels, and N is a positive integer greater than or equal to 2;
determining, by the terminal device, a first resource pool comprised in a first resource set, wherein the first resource set comprises at least one resource pool;
obtaining, by the terminal device, a resource, wherein obtaining, by the terminal device, the resource comprises:
receiving, by the terminal device, resource configuration signaling sent by a network device, wherein the resource configuration signaling indicates a resource dynamically scheduled or semi-dynamically scheduled by the network device for the terminal device, and obtaining the resource; or
obtaining, by the terminal device, the resource from the first resource set, a second resource set, or a third resource set, wherein the second resource set comprises at least one resource pool and the third resource set comprises at least one resource pool;
obtaining, by the terminal device after the terminal device determines the first resource pool comprised in the first resource set, the second resource set from the first resource set based on terminal location information, terminal speed information, a carrier restriction condition, or a congestion condition, wherein:
the second resource set comprises M resource pools, and M is an integer greater than or equal to 1, and wherein:
the terminal location information indicates that the M resource pools meet a location information requirement of the terminal device;
the terminal speed information indicates that the M resource pools meet a speed information requirement of the terminal device;
the carrier restriction condition indicates that the M resource pools respectively belong to different carriers for values of M that are greater than 1;
the congestion condition comprises that a channel congestion degree of the M resource pools and second channel congestion information meet a fourth specific relationship;
the second channel congestion information is a second channel congestion threshold or a second channel congestion range;
the fourth specific relationship is as follows:
when the second channel congestion information is the second channel congestion threshold, the fourth specific relationship is that the channel congestion degree of the M resource pools is greater than the second channel congestion threshold, the channel congestion degree of the M resource pools is equal to the second channel congestion threshold, or the channel congestion degree of the M resource pools is greater than or equal to the second channel congestion threshold; or when the second channel congestion information is the second channel congestion range, the fourth specific relationship is that the channel congestion degree of the M resource pools is within the second channel congestion range; and the channel congestion degree of the M resource pools is: a minimum value in channel congestion degrees of all of the M resource pools, a maximum value in the channel congestion degrees of all of the M resource pools, or an average value of the channel congestion degrees of all of the M resource pools; and sending, by the terminal device, the data on the N logical channels by using the resource.

2. The method according to claim 1, wherein:

separately sending, by the terminal device, the one piece of data in a PDCP entity to each of N logical channels comprises:

separately sending, by the terminal device, the data in the PDCP entity to each of L radio link control (RLC) entities corresponding to the N logical channels, wherein each of the L RLC entities corresponds to at least one of the N logical channels, different RLC entities in the L RLC entities correspond to different logical channels of the N logical channels, and L is a positive integer less than or equal to N; and sending, by the terminal device, the data on the N logical channels using the resource comprises:

sending, by the terminal device using the resource, the data in the L RLC entities corresponding to the N logical channels.

3. The method according to claim 1, wherein before separately sending, by the terminal device, the one piece of data in a PDCP entity to each of N logical channels, the method further comprises:

receiving, by the terminal device, first configuration information sent by a network device, wherein the first configuration information comprises condition information, and the condition information indicates a condition for triggering the terminal device to separately send the data in the PDCP entity to each of the N logical channels.

4. The method according to claim 3, wherein:

the condition comprises that a service priority and service priority information meet a first specific relationship;

the service priority information is a service priority threshold or a service priority range;

the first specific relationship is as follows:

when the service priority information is the service priority threshold, the first specific relationship is that the service priority is greater than the service priority threshold, the service priority is equal to the service priority threshold, or the service priority is greater than or equal to the service priority threshold; or when the service priority information is the service priority range, the first specific relationship is that the service priority is within the service priority range;

the service priority is a priority of the data or a priority of a media access control protocol data unit (MAC PDU) that comprises the data; and before obtaining, by the terminal device, the resource, the method further comprises:

determining, by the terminal device, that the first resource pool corresponds to the service priority information.

5. The method according to claim 3, wherein:

the condition comprises that a channel congestion degree of a second resource pool and first channel congestion information meet a second specific relationship;

the first channel congestion information is a first channel congestion threshold or a first channel congestion range;

the second specific relationship is as follows:

when the first channel congestion information is the first channel congestion threshold, the second specific relationship is that the channel congestion degree of the second resource pool is greater than the first channel congestion threshold, the channel congestion degree of the second resource pool is equal to the first channel congestion threshold, or the channel congestion degree of the second resource pool is greater than or equal to the first channel congestion threshold; or when the first channel congestion information is the first channel congestion range, the second specific relationship is that the channel congestion degree of the second resource pool is within the first channel congestion range; and before obtaining, by the terminal device, the resource, the method further comprises:

determining, by the terminal device, that the first resource set comprises the second resource pool, wherein the second resource pool corresponds to the first channel congestion information.

6. The method according to claim 3, wherein the condition comprises that a channel congestion degree of K logical channels and branch channel congestion information meet a third specific relationship;

the branch channel congestion information is a branch channel congestion threshold or a branch channel congestion range;

the third specific relationship is as follows:

when the branch channel congestion information is the branch channel congestion threshold, the third specific relationship is that the channel congestion degree of the K logical channels is greater than the branch channel congestion threshold, the channel congestion degree of the K logical channels is equal to the branch channel congestion threshold, or the channel congestion degree of the K logical channels is greater than or equal to the branch channel congestion threshold; or when the branch channel congestion information is the branch channel congestion range, the third specific relationship is that the channel congestion degree of the K logical channels is within the branch channel congestion range;

the channel congestion degree of the K logical channels comprises: a minimum value in channel congestion degrees of all resource pools used on the K logical channels, a maximum value in the channel congestion degrees of all the resource pools used on the K logical channels, and an average value of the channel congestion degrees of all the resource pools used on the K logical channels; and before obtaining, by the terminal device, a resource, the method further comprises:

determining, by the terminal device, that the first resource set comprises a third resource pool, wherein the third resource pool corresponds to the branch channel congestion information.

7. The method according to claim 1, wherein before sending, by the terminal device, the data on the N logical channels using the resource, the method further comprises:
receiving, by the terminal device, third indication information sent by a network device, wherein the third indication information represents a transmission mode of each of the N logical channels; or
determining, by the terminal device, a transmission mode of each of the N logical channels.

8. A terminal device, comprising:
a receiver;
a transmitter; and
a processor configured to:
obtain or determine a correspondence between a packet data convergence protocol (PDCP) entity and N logical channels using a first radio resource control (RRC) signaling;
separately send one piece of data in the PDCP entity to each of the N logical channels, wherein a direct link transmission manner is used on at least one of the N logical channels, and N is a positive integer greater than or equal to 2;
obtain a resource;
wherein:
the receiver is configured to receive resource configuration signaling sent by a network device, wherein the resource configuration signaling indicates a resource dynamically scheduled or semi-dynamically scheduled by the network device for the terminal device, and wherein the processor is configured to obtain the resource from the resource configuration signaling; or
the processor is configured to obtain the resource from any one of a first resource set, a second resource set, or a third resource set, wherein the first resource set comprises at least one resource pool, the second resource set comprises at least one resource pool, and the third resource set comprises at least one resource pool;
wherein:
the processor is further configured to, after the processor determines a first resource pool comprised in the first resource set, obtain the second resource set from the first resource set based on terminal location information, terminal speed information, a carrier restriction condition, or a congestion condition, wherein the second resource set comprises M resource pools, and M is an integer greater than or equal to 1;
the terminal location information indicates that the M resource pools meet a location information requirement of the terminal device;
the terminal speed information indicates that the M resource pools meet a speed information requirement of the terminal device;
the carrier restriction condition indicates that the M resource pools respectively belong to different carriers for values of M that are greater than 1;
the congestion condition comprises that a channel congestion degree of the M resource pools and second channel congestion information meet a fourth specific relationship;
the second channel congestion information is a second channel congestion threshold or a second channel congestion range;
the fourth specific relationship is as follows:
when the second channel congestion information is the second channel congestion threshold, the fourth specific relationship is that the channel congestion degree of the M resource pools is greater than the second channel congestion threshold, the channel congestion degree of the M resource pools is equal to the second channel congestion threshold, or the channel congestion degree of the M resource pools is greater than or equal to the second channel congestion threshold; or
when the second channel congestion information is the second channel congestion range, the fourth specific relationship is that the channel congestion degree of the M resource pools is within the second channel congestion range; and
the channel congestion degree of the M resource pools is: a minimum value in channel congestion degrees of all of the M resource pools, a maximum value in the channel congestion degrees of all of the M resource pools, or an average value of the channel congestion degrees of all of the M resource pools; and
wherein the transmitter is configured to send the data on the N logical channels using the resource.

9. The terminal device according to claim 8, wherein:
the processor is configured to:
separately send the data in the PDCP entity to each of L radio link control (RLC) entities corresponding to the N logical channels, wherein each of the L RLC entities corresponds to at least one of the N logical channels, different RLC entities in the L RLC entities correspond to different logical channels of the N logical channels, and L is a positive integer less than or equal to N; and
the transmitter is configured to:
send, using the resource, the data in the L RLC entities corresponding to the N logical channels.

10. The terminal device according to claim 8, wherein the receiver is further configured to:
before the processor separately sends the data in the PDCP entity to each of the N logical channels, receive first configuration information sent by a network device, wherein the first configuration information comprises condition information, and the condition information indicates a trigger for triggering the processor to separately send the data in the PDCP entity to each of the N logical channels.

11. The terminal device according to claim 10, wherein:
the condition information comprises that a service priority and service priority information meet a first specific relationship;
the service priority information is a service priority threshold or a service priority range;
the first specific relationship is as follows:
when the service priority information is the service priority threshold, the first specific relationship is that the service priority is greater than the service priority threshold, the service priority is equal to the service priority threshold, or the service priority is greater than or equal to the service priority threshold; or
when the service priority information is the service priority range, the first specific relationship is that the service priority is within the service priority range;

the service priority is a priority of the data or a priority of a media access control (MAC) packet data unit (PDU) that comprises the data; and the processor is further configured to:
before the processor obtains the resource, determine that the first resource set comprises a first resource pool, wherein the first resource pool corresponds to the service priority information.

12. The terminal device according to claim 10, wherein:
the condition information comprises that a channel congestion degree of a second resource pool and first channel congestion information meet a second specific relationship;
the first channel congestion information is a first channel congestion threshold or a first channel congestion range;
the second specific relationship is as follows:
when the first channel congestion information is the first channel congestion threshold, the second specific relationship is that the channel congestion degree of the second resource pool is greater than the first channel congestion threshold, the channel congestion degree of the second resource pool is equal to the first channel congestion threshold, or the channel congestion degree of the second resource pool is greater than or equal to the first channel congestion threshold; or
when the first channel congestion information is the first channel congestion range, the second specific relationship is that the channel congestion degree of the second resource pool is within the first channel congestion range; and
the processor is further configured to:
before the processor obtains the resource, determine that the first resource set comprises the second resource pool, wherein the second resource pool corresponds to the first channel congestion information.

13. The terminal device according to claim 10, wherein:
the condition information comprises that a channel congestion degree of K logical channels and branch channel congestion information meet a third specific relationship;
the branch channel congestion information is a branch channel congestion threshold or a branch channel congestion range;
the third specific relationship is as follows:
when the branch channel congestion information is the branch channel congestion threshold, the third specific relationship is that the channel congestion degree of the K logical channels is greater than the branch channel congestion threshold, the channel congestion degree of the K logical channels is equal to the branch channel congestion threshold, or the channel congestion degree of the K logical channels is greater than or equal to the branch channel congestion threshold; or
when the branch channel congestion information is the branch channel congestion range, the third specific relationship is that the channel congestion degree of the K logical channels is within the branch channel congestion range;
the channel congestion degree of the K logical channels comprises: a minimum value in channel congestion degrees of all resource pools used on the K logical channels, a maximum value in the channel congestion degrees of all the resource pools used on the K logical channels, or an average value of the channel congestion degrees of all the resource pools used on the K logical channels; and the processor is further configured to:
before the processor obtains the resource, determine that the first resource set comprises a third resource pool, wherein the third resource pool corresponds to the branch channel congestion information.

14. The terminal device according to claim 8, further comprising:
a receiver, configured to, before the processor sends the data on the N logical channels using the resource, receive third indication information sent by a network device, wherein the third indication information represents a transmission mode of each of the N logical channels; or
the processor is further configured to determine a transmission mode of each of the N logical channels before the processor sends the data on the N logical channels using the resource.

15. A method, comprising:
sending, by a first terminal device, a same one piece of data in a packet data convergence protocol (PDCP) entity to a second terminal device on N logical channels using a direct transmission manner on at least one of the N logical channels, wherein N is a positive integer greater than or equal to 2;
determining, by the first terminal device, a first resource pool comprised in a first resource set, wherein the first resource set comprises at least one resource pool;
obtaining, by the first terminal device, a resource, wherein obtaining, by the first terminal device, the resource comprises:
receiving, by the first terminal device, resource configuration signaling sent by a network device, wherein the resource configuration signaling indicates a resource dynamically scheduled or semi-dynamically scheduled by the network device for the first terminal device, and obtaining the resource; or
obtaining, by the first terminal device, the resource from the first resource set, a second resource set, or a third resource set, wherein the second resource set comprises at least one resource pool and the third resource set comprises at least one resource pool;
obtaining, by the first terminal device after the first terminal device determines the first resource pool comprised in the first resource set, the second resource set from the first resource set based on terminal location information, terminal speed information, a carrier restriction condition, or a congestion condition, wherein:
the second resource set comprises M resource pools, and M is an integer greater than or equal to 1;
the terminal location information indicates that the M resource pools meet a location information requirement of the first terminal device;
the terminal speed information indicates that the M resource pools meet a speed information requirement of the first terminal device;
the carrier restriction condition indicates that the M resource pools respectively belong to different carriers for values of M that are greater than 1;
the congestion condition comprises that a channel congestion degree of the M resource pools and second channel congestion information meet a fourth specific relationship;

the second channel congestion information is a second channel congestion threshold or a second channel congestion range;

the fourth specific relationship is as follows:
- when the second channel congestion information is the second channel congestion threshold, the fourth specific relationship is that the channel congestion degree of the M resource pools is greater than the second channel congestion threshold, the channel congestion degree of the M resource pools is equal to the second channel congestion threshold, or the channel congestion degree of the M resource pools is greater than or equal to the second channel congestion threshold; or
- when the second channel congestion information is the second channel congestion range, the fourth specific relationship is that the channel congestion degree of the M resource pools is within the second channel congestion range; and the channel congestion degree of the M resource pools is: a minimum value in channel congestion degrees of all of the M resource pools, a maximum value in the channel congestion degrees of all of the M resource pools, or an average value of the channel congestion degrees of all of the M resource pools; and sending, by the first terminal device using the resource, the same one piece of data to the second terminal device on the N logical channels.

\* \* \* \* \*